United States Patent
Dipin

(10) Patent No.: US 10,101,884 B2
(45) Date of Patent: Oct. 16, 2018

(54) WEARABLE DEVICE AND CONTROLLING METHOD THEREOF

(71) Applicant: Samsung Electronics Co., Ltd., Suwon-si, Gyeonggi-do (KR)

(72) Inventor: Kollencheri Puthenveettil Dipin, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 14/706,439

(22) Filed: May 7, 2015

(65) Prior Publication Data
US 2015/0324078 A1 Nov. 12, 2015

(30) Foreign Application Priority Data

May 7, 2014 (IN) .......................... 2284/CHE/2014
Apr. 17, 2015 (KR) ........................ 10-2015-0054502

(51) Int. Cl.
| | | |
|---|---|---|
| G06F 3/0484 | (2013.01) | |
| G06F 3/0485 | (2013.01) | |
| G06F 3/0481 | (2013.01) | |
| H04M 1/725 | (2006.01) | |
| G08C 17/02 | (2006.01) | |
| G06F 3/0488 | (2013.01) | |

(52) U.S. Cl.
CPC .......... *G06F 3/0484* (2013.01); *G06F 3/0485* (2013.01); *G06F 3/04817* (2013.01); *G08C 17/02* (2013.01); *H04M 1/7253* (2013.01); *G06F 3/04883* (2013.01); *G06F 3/04886* (2013.01); *G08C 2201/20* (2013.01); *G08C 2201/32* (2013.01); *G08C 2201/34* (2013.01); *H04M 1/72586* (2013.01)

(58) Field of Classification Search
CPC ..................................................... G06F 3/0484
USPC ........................................................ 715/765
See application file for complete search history.

(56) References Cited

U.S. PATENT DOCUMENTS

| | | | |
|---|---|---|---|
| 5,832,296 A | 11/1998 | Wang et al. | |
| 2006/0255963 A1 | 11/2006 | Thompson et al. | |
| 2009/0146947 A1 | 6/2009 | Ng | |
| 2010/0097319 A1* | 4/2010 | Billard | G06F 3/0338 345/167 |
| 2012/0092383 A1 | 4/2012 | Hysek et al. | |
| 2012/0159472 A1 | 6/2012 | Hong et al. | |
| 2013/0145287 A1 | 6/2013 | Jung et al. | |
| 2013/0254705 A1 | 9/2013 | Mooring et al. | |
| 2013/0290233 A1* | 10/2013 | Ferren | G06K 9/3266 706/46 |
| 2013/0339228 A1* | 12/2013 | Shuster | G06F 9/541 705/40 |
| 2014/0152597 A1* | 6/2014 | Lee | G06F 3/0416 345/173 |
| 2014/0184496 A1* | 7/2014 | Gribetz | G02B 27/017 345/156 |

(Continued)

FOREIGN PATENT DOCUMENTS

| | | |
|---|---|---|
| WO | 2013/045983 A1 | 4/2013 |
| WO | 2014/021602 A2 | 2/2014 |

*Primary Examiner* — William D Titcomb
(74) *Attorney, Agent, or Firm* — Jefferson IP Law, LLP

(57) ABSTRACT

A wearable device configured to pair with a plurality of electronic devices via a wireless network and to display a graphics user interface that includes a plurality of home screens corresponding to the plurality of electronic devices.

21 Claims, 33 Drawing Sheets

(56) References Cited

U.S. PATENT DOCUMENTS

| | | | |
|---|---|---|---|
| 2014/0198035 A1* | 7/2014 | Bailey | G06F 3/014 345/156 |
| 2014/0298172 A1* | 10/2014 | Choi | G06F 3/0488 715/716 |
| 2014/0302470 A1* | 10/2014 | Zapantis | G09B 19/00 434/236 |
| 2015/0026615 A1* | 1/2015 | Choi | G06F 3/0484 715/765 |
| 2017/0220361 A1* | 8/2017 | Sharma | G06F 3/0482 |

\* cited by examiner

WEARABLE DEVICE AND CONTROLLING METHOD THEREOF

CROSS-REFERENCE TO RELATED APPLICATIONS

This application claims the benefit of Indian Patent Application No. 2284/CHE/2014, filed on May 7, 2014, in the Indian Patent Office and Korean Patent Application No. 10-2015-0054502, filed on Apr. 17, 2015, in the Korean Intellectual Property Office, the disclosures of which are incorporated herein in their entirety by reference.

BACKGROUND

1. Field

One or more exemplary embodiments relate to a wearable device and a controlling method thereof.

2. Description of the Related Art

As research on wearable devices has been actively conducted, various wearable devices have been released or are expected to be released. Examples of wearable devices that have been released or are expected to be released include smart watches, smart glasses, smart bands, etc.

Since a wearable device is attached to a user's body, the wearable device is very accessible and may be used to provide various services to the user together with or independently from mobile devices such as a smart phone and a tablet computer.

However, wearable devices according to the related art have a small display, limited performance, and a limited input manner, and thus, users have difficulties in properly controlling them. Thus, there is a need to develop wearable devices that can be easily controlled by users.

SUMMARY

One or more exemplary embodiments include a wearable device that can be easily controlled by a user.

Additional aspects will be set forth in part in the description which follows and, in part, will be apparent from the description, or may be learned by practice of the presented exemplary embodiments.

According to one or more exemplary embodiments, a wearable device includes a communication unit configured to pair with a plurality of electronic devices via a wireless network, a display unit configured to display at least a portion of a graphics user interface that includes a plurality of home screens corresponding to the plurality of electronic devices, a user input receiving unit configured to receive a user input regarding the graphics user interface, and a controller configured to control the graphics user interface based on the received user input.

The controller may be further configured to remove from the graphics user interface a home screen corresponding to an electronic device unpaired from the wearable device and insert into the graphics user interface a home screen corresponding to an electronic device paired again with the wearable device.

The plurality of home screens may be scrolled in the graphics user interface based on the received user input.

The controller may be further configured to determine an order in which the plurality of home screens are arranged in the graphics user interface based on a preset criterion.

The controller may be further configured to determine an order in which the plurality of home screens are arranged in the graphics user interface based on a proximity between each of the plurality of electronic devices and the wearable device.

The controller may be further configured to determine an order in which the plurality of home screens are arranged in the graphics user interface based on a location of the wearable device.

The controller may be further configured to determine an order in which the plurality of home screens are arranged in the graphics user interface based on reliability of each of the plurality of electronic devices.

The controller may be further configured to determine an order in which the plurality of home screens are arranged in the graphics user interface based on a chronological order of alarms pushed from the plurality of electronic devices to the wearable device.

The controller may be further configured to determine an order in which the plurality of home screens are arranged in the graphics user interface by analyzing a user's usage pattern of each of the plurality of electronic devices.

Each of the plurality of home screens may be divided by a plurality of grids, wherein the controller may be further configured to arrange icons of applications, which are to be driven in each of the plurality of electronic devices, between the plurality of grids based on a preset criterion.

The icons may be arranged between the plurality of grids based on an order in which the applications are arranged in predetermined regions of each of the plurality of electronic devices.

The icons may be arranged between the plurality of grids based on a frequency of driving the applications in each of the plurality of electronic devices.

The icons may be scrolled based on an input at an intersection of the plurality of grids.

The user input receiving unit may be further configured to receive a drag input passing by at least one icon among the icons, starting from an intersection of the plurality of grids, wherein the controller may be further configured to select the at least one icon that the drag input passes by in the plurality of home screens.

The controller may be further configured to transmit data obtained from a first electronic device corresponding to a first home screen to a second electronic device corresponding to a second home screen among the plurality of home screens via the communication unit based on inputs with respect to the first and second home screens.

The controller may be further configured to mediate between the first electronic device and the second electronic device by transmitting metadata obtained from the first electronic device to the second electronic device via the communication unit.

According to one or more exemplary embodiments, a method of controlling a wearable device includes paring with a plurality of electronic devices via a wireless network, displaying at least a portion of a graphics user interface that includes a plurality of home screens corresponding to the plurality of electronic devices, receiving an input regarding the graphics user interface, and controlling the graphics user interface based on the received input.

The method may further include removing from the graphics user interface a home screen corresponding to an electronic device unpared from the wearable device and inserting into the graphics user interface a home screen corresponding to an electronic device paired again with the wearable device.

The plurality of home screens may be scrolled in the graphics user interface based on the received input.

The method may further include determining an order in which the plurality of home screens are arranged in the graphics user interface based on a preset criterion.

Each of the plurality of home screens may be divided by a plurality of grids, and the method may further include arranging icons of applications, which are to be driven in the plurality of electronic devices, between the plurality of grids based on a preset criterion.

The method may further include receiving a first input regarding a first home screen from among the plurality of home screens, obtaining data from a first electronic device corresponding to the first home screen based on the first input, receiving a second input regarding a second home screen from among the plurality of home screens, and transmitting the data obtained from the first electronic device to a second electronic device corresponding to the second home screen based on the second input.

According to one or more exemplary embodiments, there is provided a computer-readable recording medium having recorded thereon a program for performing the above method.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
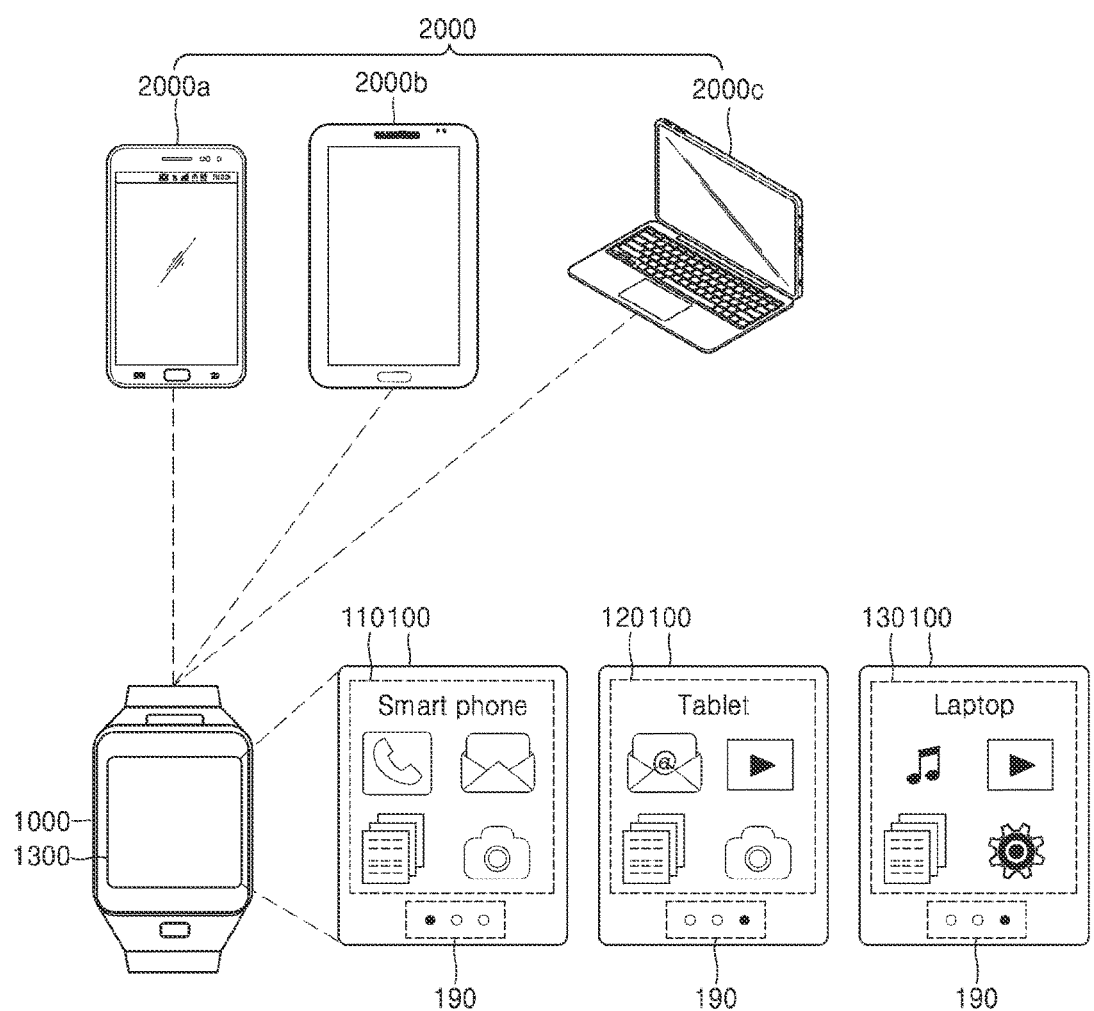
FIG. 1 is a diagram illustrating an example of a graphics user interface corresponding to a plurality of electronic devices according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. In the following description, well-known functions or constructions are not described in detail if it is determined that they would obscure the inventive concept due to unnecessary detail. As used herein, the term "and/or" includes any and all combinations of one or more of the associated listed items. Expressions such as "at least one of," when preceding a list of elements, modify the entire list of elements and do not modify the individual elements of the list.

In the present disclosure, general terms that have been widely used nowadays are selected, if possible, in consideration of functions of the inventive concept, but non-general terms may be selected according to the intentions of technicians in the this art, precedents, or new technologies, etc. Also, some terms may be arbitrarily chosen by the present applicant. In this case, the meanings of these terms will be explained in corresponding parts of the present disclosure in detail. Thus, the terms used herein should be defined not based on the names thereof but based on the meanings thereof and the whole context of the inventive concept.

As used herein, the singular forms 'a', 'an' and 'the' are intended to include the plural forms as well, unless the context clearly indicates otherwise. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof. In particular, the numbers mentioned in the present disclosure are merely examples provided to help understanding of the exemplary embodiments set forth herein and thus the exemplary embodiments are not limited thereto.

In the present disclosure, the term such as 'unit', 'module', etc. should be understood as a unit in which at least one function or operation is processed and may be embodied as hardware, software, or a combination of hardware and software.

It will be understood that, although the terms 'first', 'second', 'third', etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used in the present disclosure will now be briefly described before exemplary embodiments are described in detail.

In the present disclosure, the term 'wearable device' should be understood to include watches, bracelets, rings, glasses, and hair bands having a communication function and a data processing function but is not limited thereto.

In the present disclosure, the term 'electronic device' should be understood to include smart phones, tablet computers, mobile phones, personal digital assistants (PDAs), media players, portable multimedia players (PMPs), e-book terminals, digital broadcasting terminals, PCs, laptop computers, micro-servers, global positioning system (GPS) devices, navigation devices, kiosks, MP3 players, smart televisions (TVs), digital cameras, and other mobile/non-mobile computing devices but is not limited thereto.

In the present disclosure, the term 'graphics user interface' should be understood to include all objects displayed visually on a wearable device so that a user may use the wearable device. The graphics user interface includes a home screen corresponding to an electronic device that is paired with the wearable device. If a display unit of the wearable device has a small screen or a low resolution and thus the entire graphics user interface cannot be displayed, only a portion of the graphics user interface can be displayed.

In the present disclosure, the expression "a home screen corresponding to an electronic device" means a graphics user interface that includes icons of applications to be driven in an electronic device paired with a wearable device, so that a user may access the applications via the wearable device. For example, a home screen corresponding to a smart phone includes icons of application to be driven in the smart phone via a wearable device.

In the present disclosure, an abbreviation for a 'home screen corresponding to an electronic device' may be used for convenience of explanation. For example, a 'home screen corresponding to a smart phone' may be expressed as a smart phone home screen.

FIG. 1 is a diagram illustrating an example of a graphics user interface 100 corresponding to a plurality of electronic devices 2000 according to an exemplary embodiment.

Referring to FIG. 1, a wearable device 1000 may display at least a portion of a graphics user interface 100 that includes a plurality of home screens 110, 120, and 130 corresponding to the plurality of electronic devices 2000.

The wearable device 1000 is illustrated in the form of a watch in FIG. 1, but is not limited thereto.

The plurality of electronic devices 2000 are illustrated as a smart phone 2000a, a tablet computer 2000b, and a laptop computer 2000c in FIG. 1, but are not limited thereto.

Each of the plurality of electronic devices 2000 is paired with the wearable device 1000 via a wireless network. When the plurality of electronic devices 2000 are paired with the wearable device 1000, data may be exchanged between each of the plurality of electronic devices 2000 and the wearable device 1000. Here, the wireless network may be Bluetooth but is not limited thereto. The wearable device 1000 and each of the plurality of electronic devices 2000 may be paired with each other via other various wireless networks.

The wearable device 1000 displays at least a portion of the graphics user interface 100 that includes the plurality of home screens 110, 120, and 130 corresponding to the plurality of electronic devices 2000.

When the wearable device 1000 has a small screen or a low resolution, the plurality of home screens 110, 120, and 130 included in the graphics user interface 100 may not be displayed on the screen of the wearable device 1000 all at once. That is, the entire graphics user interface 100 may not be displayed on the wearable device 100 at once and only a portion of the graphics user interface 100 may be displayed on the wearable device 100.

In one exemplary embodiment, each of home screens may be scrolled within the graphics user interface 100. For example, as illustrated in FIG. 1, each of the home screens 110, 120, and 130 may be scrolled in the graphics user interface 100 in a horizontal direction.

An input instructing to scroll a home screen in the horizontal direction may include various gesture inputs, e.g., a drag input that is input in the horizontal direction, a swipe input that is input in the horizontal direction, etc., but may be input using physical buttons of the wearable device 1000.

In one exemplary embodiment, a home screen may be embodied as being scrolled in not only the horizontal direction but also other various directions.

In one exemplary embodiment, home screens may not be scrolled and may be embodied as being alternately displayed according to a user input.

In one exemplary embodiment, the graphics user interface 100 may include a plurality of pages and home screens may be arranged in the plurality of pages, respectively.

Referring to FIG. 1, the graphics user interface 100 includes the smart phone home screen 110 corresponding to a smart phone, the tablet home screen 120 corresponding to a tablet computer, and the laptop computer home screen 130 corresponding to a laptop computer.

In one exemplary embodiment, on the wearable device 1000, a plurality of home screens may be arranged in the graphics user interface 100 in an order that is preset or that is arbitrarily set by a user. For example, as illustrated in FIG. 1, the home screens 110, 120, and 130 may be preset or arbitrarily set by a user to be sequentially arranged in the graphics user interface 100.

In one exemplary embodiment, the graphics user interface 100 may further include a home screen indicator 190. The home screen indicator 190 enables a user to notice a relative location of a home screen displayed on the graphics user interface 100 among the plurality of home screens 110, 120, and 130. Referring to FIG. 1, when the home screen indicator 190 includes three circles 'o', it means that the graphics user interface 100 includes three home screens. The three circles 'o' correspond to the three home screens, respectively. A shaded circle '●' among the three circles 'o' corresponds to the home screen being displayed on the wearable device 1000.

Figure 2A:
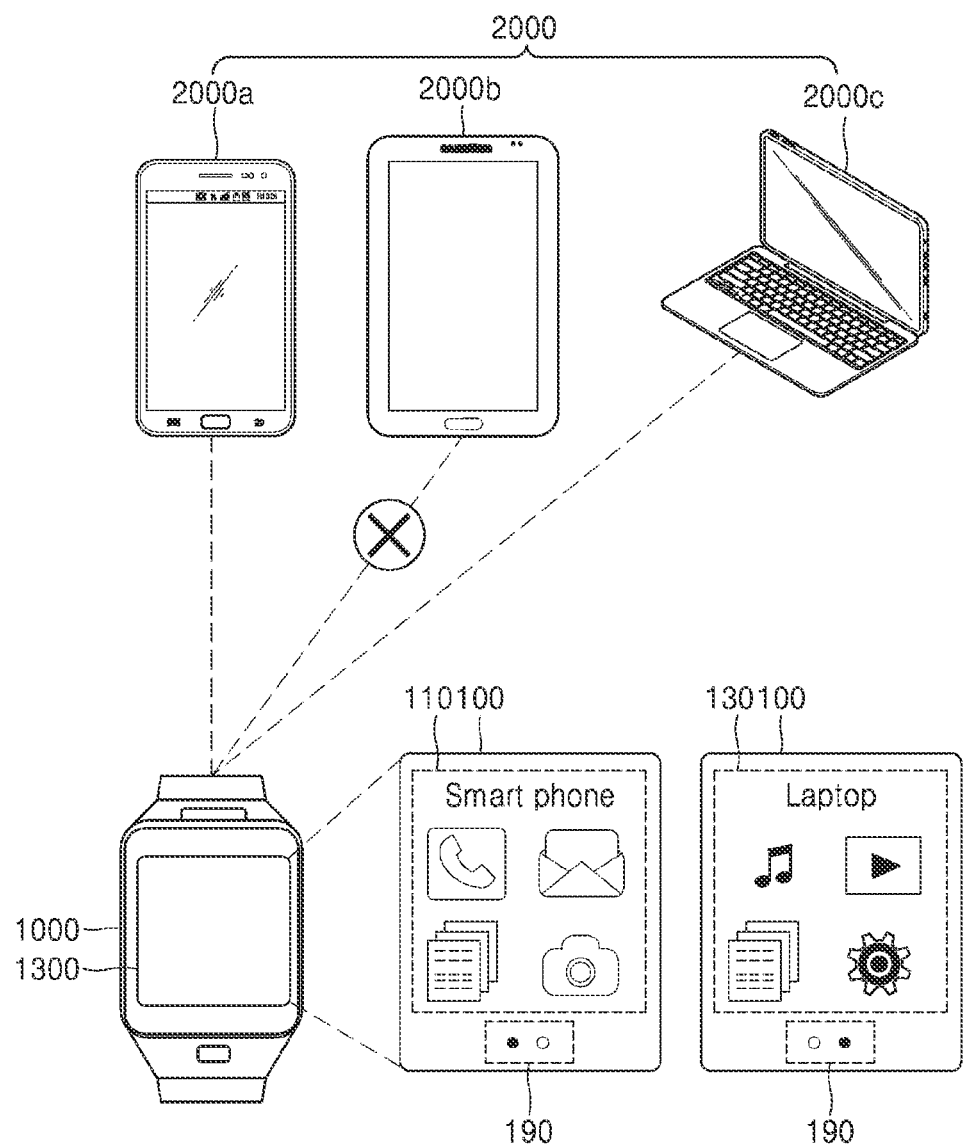
FIGS. 2A and 2B are diagrams illustrating an example of graphics user interface that dynamically changes based on a pairing between a wearable device and a plurality of electronic devices according to exemplary embodiments.
Figure 2B:
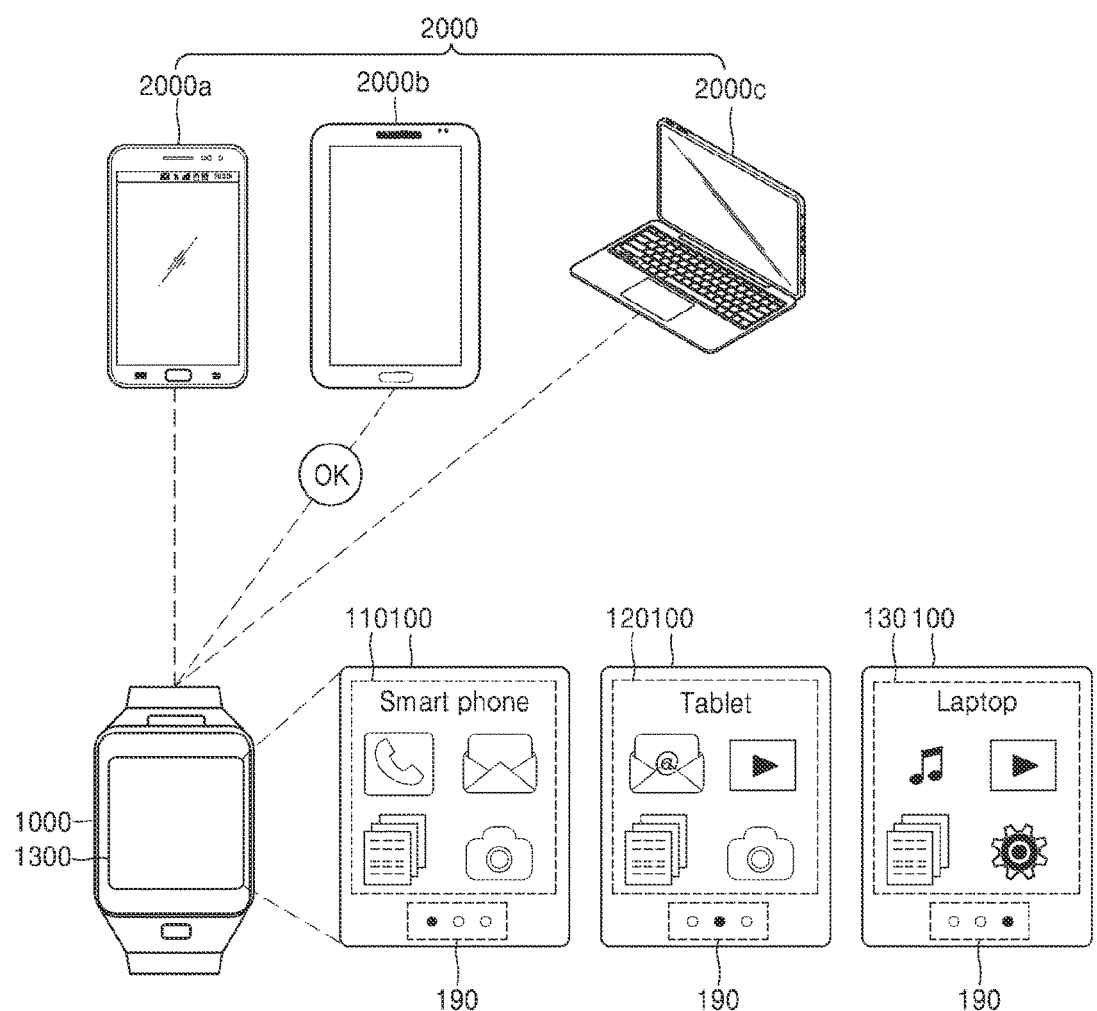

FIGS. 2A and 2B are diagrams illustrating an example of graphics user interface that dynamically change based on a pairing between a wearable device 1000 and a plurality of electronic devices 2000 according to exemplary embodiments.

Referring to FIG. 2A, the wearable device 1000 may be configured to remove from a graphics user interface 100 a home screen corresponding to an electronic device 200b unpaired from the wearable device 1000, among the plurality of electronic devices 2000.

A pairing between an electronic device 2000 and the wearable device 1000 that are paired with each other via a wireless network may be canceled when the distance between the electronic device 2000 and the wearable device 1000 increases or when a network problem occurs in any one of the electronic device 2000 and the wearable device 1000. When the pairing between an electronic device 2000 and the wearable device 1000 is canceled, an electronic device 2000 is unpaired from the wearable device 1000. For example, referring to FIG. 2A, when a user of a tablet computer 2000*b* paired with the wearable device 1000 via Bluetooth goes out without the tablet computer 2000*b*, the tablet computer 2000*b* may be unpaired from the wearable device 1000.

When the pairing between the wearable device 1000 and the tablet computer 2000*b* is canceled, the user cannot perform an operation on the tablet computer 2000*b* by using the wearable device 1000. Thus, when a home screen corresponding to an electronic device 2000 unpaired from the wearable device 1000 is present in the graphics user interface 100, inconvenience may be caused to a user who uses the wearable device 1000.

Thus, as illustrated in FIG. 2A, the wearable device 1000 may remove from the graphics user interface 100 a home screen corresponding to the tablet computer 2000*b* unpaired from the wearable device 1000, thereby increasing user convenience.

In one exemplary embodiment, even if a pairing between the wearable device 1000 and an electronic device 2000 is canceled, when the electronic device 2000 may indirectly communicate with the wearable device 1000 via an additional wire/wireless network, that is, when a user may continuously perform an operation on the electronic device 2000 via the wearable device 1000, the wearable device 1000 may not remove a home screen corresponding to the electronic device 2000 from the graphics user interface 100.

For example, if a desktop computer and the wearable device 1000 are paired with each other via Bluetooth, the pairing between the wearable device 1000 and the desktop computer is canceled when the distance between the wearable device 1000 and the desktop computer increases. However, when the wearable device 1000 is accessible to the Internet via WIFI and the desktop computer is accessible to the Internet via a local area network (LAN) or WIFI, a user may still perform an operation on the desktop computer via the wearable device 1000. In this case, the wearable device 1000 may not remove a home screen corresponding to the desktop computer from the graphics user interface 100.

Referring to FIG. 2B, the wearable device 1000 may be configured to insert into the graphics user interface 100 a home screen 120 corresponding to the electronic device 2000*b* paired with the wearable device 1000 again.

The electronic device 2000*b* unpaired from the wearable device 1000 may be paired with the wearable device 1000 again, for example, when the distance between the wearable device 1000 and the electronic device 2000*b* decreases or when a network fault is recovered. For example, referring to FIG. 2B, when a user who went out without the tablet computer 2000*b* returns home, the wearable device 1000 and the tablet computer 2000*b* may be paired with each other again.

The wearable device 1000 may insert the home screen 120, which was removed from the graphics user interface 100, again into the graphics user interface 100. Referring to FIG. 2B, the wearable device 1000 may insert into the graphics user interface 100 the home screen 120 corresponding to the tablet computer 2000*b* paired with the wearable device 1000 again. Thus, a user may easily notice at a glance that the electronic device 2000*b* unpaired from the wearable device 1000 is paired with the wearable device 1000 again.

In one exemplary embodiment, when the wearable device 1000 and the electronic device 2000*b* are paired with each other again, the wearable device 1000 may sound an alarm so that a user may notice this fact.

Figure 3:
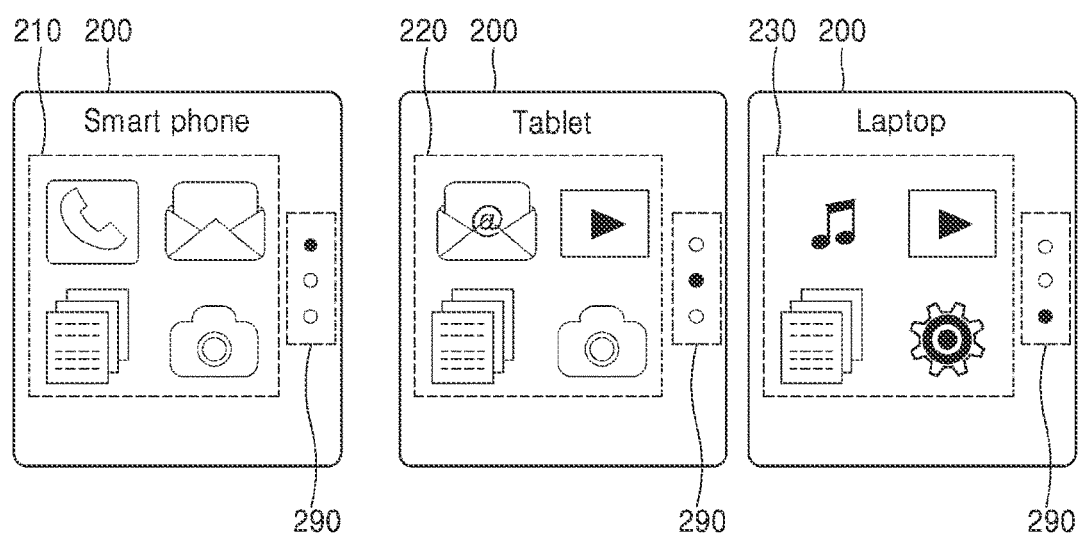
FIG. 3 is a diagram illustrating an example of a graphics user interface in which a plurality of home screens are arranged according to an exemplary embodiment.

FIG. 3 is a diagram illustrating an example of a graphics user interface 200 in which a plurality of home screens 210, 220, and 230 are arranged according to an exemplary embodiment.

As described above, when the wearable device 1000 has a small screen or a low resolution, all the home screens 210, 220, and 230 included in the graphics user interface 200 may not be displayed on the wearable device 1000.

Thus, the home screens 210, 220, and 230 may be scrolled in a vertical direction as illustrated in FIG. 3. However, the home screens 210, 220, and 230 are not limited thereto and may be scrolled in other various directions.

An input for scrolling the home screens 210, 220, and 230 in the vertical direction may include various gesture inputs, e.g., a drag input that is input in the vertical direction, a swipe input that is input in the vertical direction, etc., but may be input using physical buttons of the wearable device 1000.

In one exemplary embodiment, the home screens 210, 220, and 230 may be configured to not be scrolled in the graphics user interface 200 and to be alternately displayed according to a user input.

In one exemplary embodiment, when a user's tap input with respect to a central non-icon region of the graphics user interface 200 of the wearable device 1000 is received, the tablet home screen 220 that is not displayed may be displayed in the graphics user interface 200 instead of the smart phone home screen 210 displayed in the graphics user interface 200. The tablet home screen 220 may be a home screen which is arranged subsequent to the smart phone home screen 210. A non-icon region may be a region where an icon is not arranged.

For example, referring to FIG. 3, if the smart phone home screen 210 is displayed in the graphics user interface 200 of the wearable device 1000, when a user's tap input with respect to a central non-icon region of the smart phone home screen 210 is received, the tablet home screen 220 may be displayed instead of the smart phone home screen 210. When a user's tap input with respect to the central non-icon region of the tablet home screen 220 is received, the laptop computer home screen 230 may be displayed instead of the tablet home screen 220.

In one exemplary embodiment, when a user's tap input with respect to a periphery non-icon region of the graphics user interface 200 of the wearable device 1000 is received, the tablet home screen 220 may be displayed instead of the smart phone home screen 210 displayed in the graphics user interface 200.

A user's input for alternately displaying the home screens 210, 220, and 230 is not limited to the above tap input and may include various gesture inputs or be input using physical buttons of the wearable device 1000.

Figure 4A:
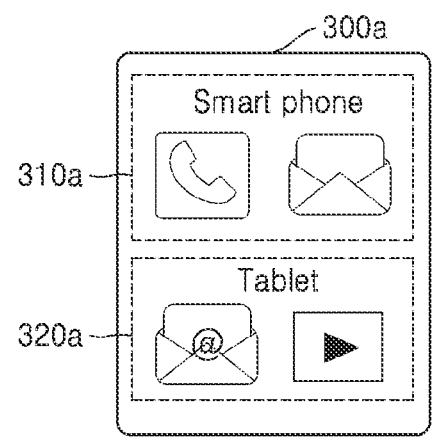
FIGS. 4A and 4B are diagrams illustrating an example of graphics user interfaces in which a plurality of home screens are arranged to other exemplary embodiments.
Figure 4B:
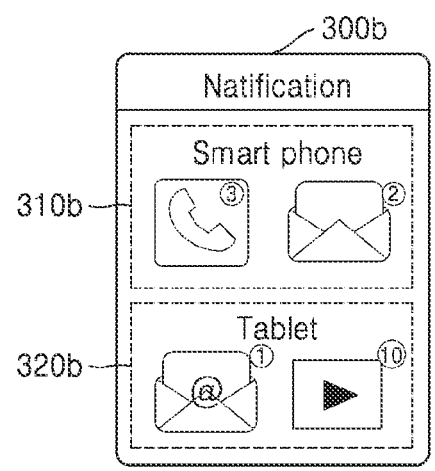

FIGS. 4A and 4B are diagrams illustrating an example of graphics user interfaces 300*a* and 300*b* a plurality of home screens 310*a*, 320*a*, 310*b*, and 320*b* are arranged according to other exemplary embodiments.

Referring to FIG. 4A, in one exemplary embodiment, at least two home screens 310*a* and 320*a* from among a plurality of home screens corresponding to a plurality of electronic devices 2000 paired with the wearable device 1000 may be displayed together in the graphics user interface 300*a* of the wearable device 1000.

When the home screens 310*a* and 320*a* are displayed together in the graphics user interface 300*a* of the wearable device 1000, a user may easily notice the electronic devices paired with the wearable device 1000 and perform an operation thereon.

The graphics user interface 300a may be configured to that two home screens are displayed together in a page of the graphics user interface 300a and another home screen is displayed in another page of the graphics user interface 300a.

For example, as illustrated in FIG. 4A, the smart phone home screen 310a and the tablet home screen 320a may be sequentially arranged in the graphics user interface 300a in the vertical direction. However, exemplary embodiments are not limited thereto, and the smart phone home screen 310a may be arranged in a left region of the graphics user interface 300a and the tablet home screen 320a may be arranged in a right region of the graphics user interface 300a, respectively, or arranged in various locations in the graphics user interface 300a.

In one exemplary embodiment, the wearable device 1000 may determine an order in which a plurality of home screens are arranged in a graphics user interface, based on a preset criterion.

In one exemplary embodiment, the wearable device 1000 may determine an order in which home screens are arranged in a graphics user interface according to the plurality of electronic devices 2000. For example, referring to FIG. 4A, the smart phone home screen 310a may be determined to be always arranged above the tablet home screen 320a.

In one exemplary embodiment, the wearable device 1000 may determine an order in which home screens are arranged in a graphics user interface, based on proximity between each of the plurality of electronic devices 2000 and the wearable device 1000. In this case, the proximity between each of the plurality of electronic devices 2000 and the wearable device 1000 may be determined based on the intensity of a pairing signal between them.

For example, when a smart phone is located closest to a user and a tablet computer is located secondly close to the user among a plurality of electronic devices 2000 paired with the wearable device 1000, the smart phone home screens 310a and the tablet home screen 320a are sequentially arranged in the graphics user interface 300a as illustrated in FIG. 4A.

In one exemplary embodiment, the wearable device 1000 may determine an order in which home screens are arranged in a graphics user interface, based on the location of the wearable device 1000. In this case, the location of the wearable device 1000 may be checked by using a sensor (such as a GPS) installed in the wearable device 1000.

For example, the wearable device 1000 may be configured to sequentially arrange a laptop computer home screen, a tablet home screen, and a smart phone home screen when the wearable device 1000 is located in a user's home, and to sequentially arrange the smart phone home screen, the tablet home screen, and the laptop computer home screen when the wearable device 1000 is not located in the user's home.

In one exemplary embodiment, the wearable device 1000 may determine an order in which the home screens are arranged in the graphics user interface, based on not only the user's home but also other various places.

In one exemplary embodiment, the wearable device 1000 may determine an order in which the home screens are arranged in the graphics user interface, based on the reliabilities of the plurality of electronic devices 2000. In this case, the reliabilities of the plurality of electronic devices 2000 may be determined according to various criteria.

For example, the reliability of each of the electronic devices 2000 may be determined based on the number of times that the electronic device 2000 is paired with the wearable device 1000, whether identification of a user of the electronic device 2000 is authenticated, whether a vaccine program is installed in the electronic device 2000, a result of analysis on a malignant code or virus in the electronic device 2000, and etc.

In one exemplary embodiment, the wearable device 1000 may determine an order in which the home screens are arranged in the graphics user interface by analyzing a user's usage pattern of each of the plurality of electronic devices 2000. Here, the user's usage pattern of each of the electronic devices 2000 may be analyzed when the user uses the electronic device 2000 and/or when the user performs an operation on the electronic device 2000 via the wearable device 1000.

Also, the user's usage pattern of each of the electronic devices 2000 may be a time period that the user uses the electronic device 2000 or a time period that the user performs an operation on the electronic device 2000 via the wearable device 1000. For example, when the user uses a smart phone more frequently than other electronic devices or more frequently performs an operation on the smart phone via the wearable device 1000 than other electronic devices, the wearable device 1000 may arrange a smart phone home screen before home screens corresponding to the other electronic devices.

In one exemplary embodiment, the graphics user interface 300b may be a notification graphics user interface as illustrated in FIG. 4B. The wearable device 1000 may provide a user with notifications received via the plurality of electronic devices 2000 by using the notification graphics user interface 300b.

Referring to FIG. 4B, the graphics user interface 300b may be a notification graphics user interface and include home screens 310b and 320b for providing notifications received via each of a plurality of electronic devices 2000 paired with the wearable device 1000. For example, as illustrated in FIG. 4B, the notification graphics user interface 300b may include the home screen 310b providing a notification received via a smart phone and the home screen 320b providing a notification received via a table computer.

Thus, a user may easily notice notifications received via the plurality of electronic devices 2000 on the wearable device 1000.

In one exemplary embodiment, the wearable device 1000 may determine an order in which the home screens 310b and 320b are arranged in the graphics user interface 300b, based on a chronological order of alarms pushed from the plurality of electronic devices 2000 to the wearable device 1000. The chronological order of alarms pushed from the plurality of electronic devices 2000 to the wearable device 1000 may be times when the alarms are pushed to the wearable device 1000, but is not limited thereto and may be times observed based various criteria, e.g., times when the alarms arrived at the electronic device 2000.

In general, alarms pushed to an electronic device 2000 are arranged on the electronic device 2000 in a chronological order. Thus, in order that a user may also experience same user experience on the wearable device 1000, in one exemplary embodiment, the wearable device 1000 may arrange a home screen corresponding to an electronic device 2000 which pushed an alarm relatively later before home screens corresponding to other electronic devices 2000 which pushed an alarm relatively earlier.

For example, as illustrated in FIG. 4B, alarms related to phone calls and text messages may be pushed from a smart phone to the wearable device 1000 and alarms related to email and video may be pushed from a table computer to the wearable device 1000. When the alarms related to phone calls and text messages are pushed to the wearable device 1000 from the smart phone later than the alarms related to email and video are pushed to the wearable device 1000 from the tablet computer, the wearable device 1000 may arrange the smart phone home screen 310b before the tablet home screen 320b.

Figure 5A:
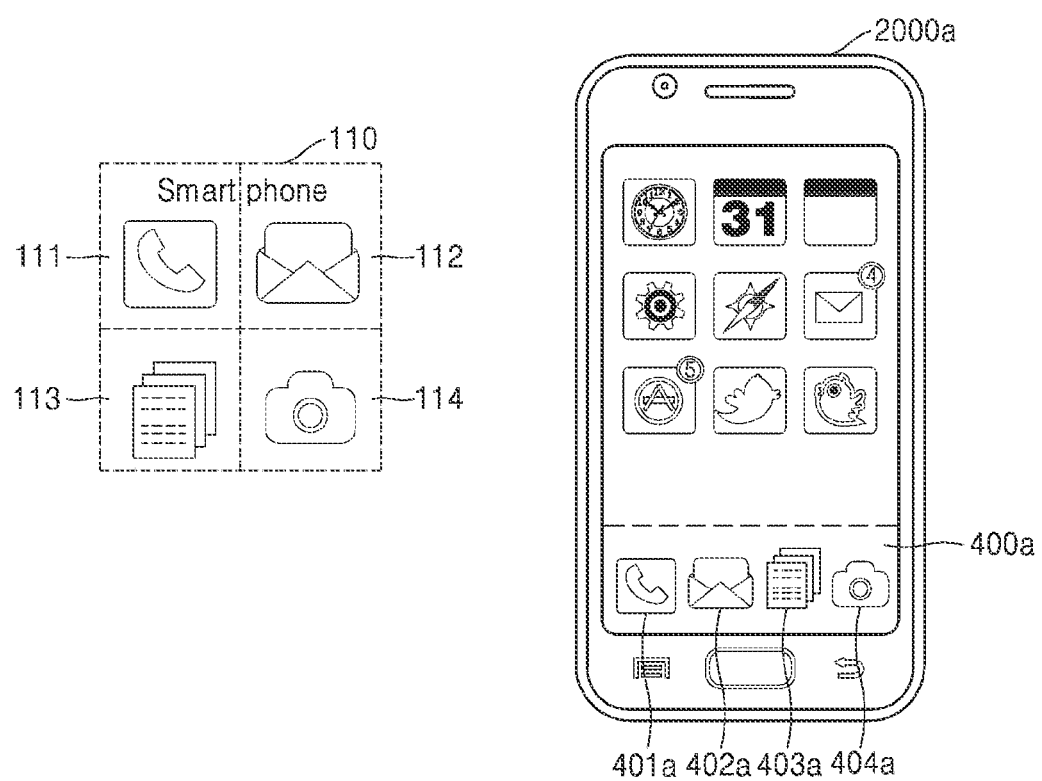
FIGS. 5A to 5C are diagrams illustrating an example of home screens in which icons of applications are arranged according to exemplary embodiments.
Figure 5B:
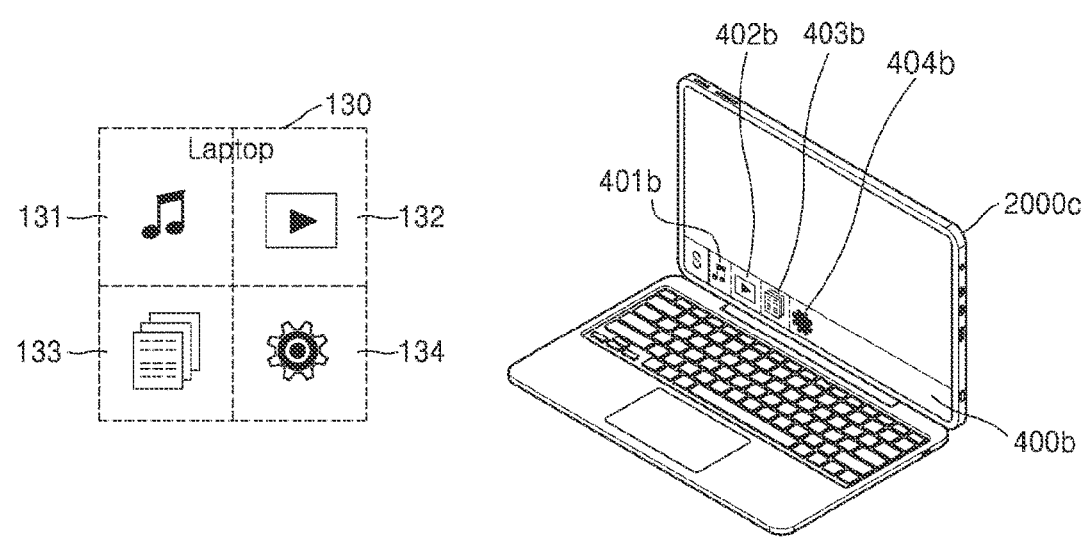
Figure 5C:
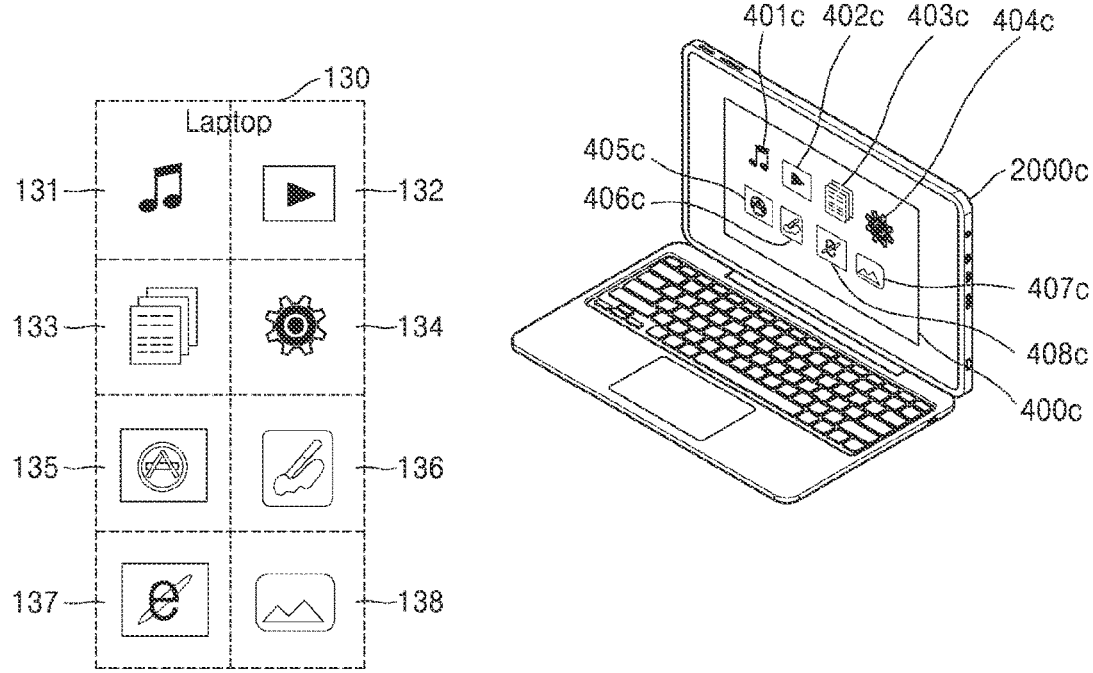

FIGS. 5A to 5C are diagrams illustrating an example of home screens 110 and 130 in which icons 111 to 114 and 131 to 134 of applications are arranged according to exemplary embodiments.

Referring to FIG. 5A, the smart phone home screen 110 is divided into four regions by a horizontal-direction grid and a vertical-direction grid. In one exemplary embodiment, the wearable device 1000 may arrange icons of applications 401a to 404a, which are to be driven in a smart phone 2000a, between the grids, that is, in the four regions, based on a preset criterion.

In one exemplary embodiment, the grids may be virtual grids that are not displayed on a screen of the wearable device 1000.

The wearable device 1000 may arrange icons of applications in a home screen, based on an order in which the icons of the applications are arranged in a predetermined region of an electronic device 2000.

Referring to FIG. 5A, the smart phone 2000a may include a dock region 400a at a lower end of a screen of the smart phone 2000a so that a user may rapidly access the applications 401a to 404a that are frequently used.

As illustrated in FIG. 5A, in one exemplary embodiment, when the icons 401a to 404a are arranged in the dock region 400a in the order of a phone application, a text message application, an archive application, and a camera application, the wearable device 1000 may arrange the icons 111 to 114 in the order of the phone application, the text message application, the archive application, and the camera application.

As illustrated in FIG. 5B, when an electronic device 2000 is a laptop computer 2000c and icons 410b to 404b are arranged on a task bar 400b of a screen of the laptop computer 2000c in the order of a music application, a video application, an archive application, and a setup application, the wearable device 1000 may arrange the icons 111 to 114 in the order of the music application, the video application, the archive application, and the setup application.

The predetermined region of the electronic device 2000 may be the dock region 400a of the smart phone 2000a, the task bar 400b of the screen of the laptop computer 2000c, or a folder of application icons 400c of an electronic device 2000 as illustrated in FIG. 5C. The folder of application icons 400c may be, for example, a desktop folder.

As illustrated in FIG. 5C, in one exemplary embodiment, when the number of applications included in the folder of application icons 400c of the electronic device 2000 is eight and the number of icons of applications to be displayed on the screen of the wearable device 1000 is four, the laptop computer home screen 130 may be configured to that four application icons are scrolled at a time, e.g., once four application icons 131 to 134 are scrolled, four other application icons 135 to 138 may be displayed.

In one exemplary embodiment, when the number of applications included in a folder of application icons of an electronic device 2000 is eight and the number of icons of applications to be displayed on the screen of the wearable device 1000 is four, the home screen 130 corresponding to the laptop computer 2000c may include two pages, the four icons 131 to 134 may be arranged in one of the two pages, and the four icons 135 to 138 may be arranged in the other page.

In one exemplary embodiment, the wearable device 1000 may arrange icons of applications in a home screen, based on a frequency of an event that the applications are driven in the electronic device 2000. Here, the frequency of the event that the applications are driven may be a frequency of an event that the applications are driven in the electronic device 2000 without the wearable device 1000, a frequency of an event that the applications are driven in the electronic device 2000 via the wearable device 1000, or a combination thereof.

For example, when a phone application is most frequently driven in a smart phone, the wearable device 1000 may arrange a phone application icon at the front of a smart phone home screen.

Figure 6:
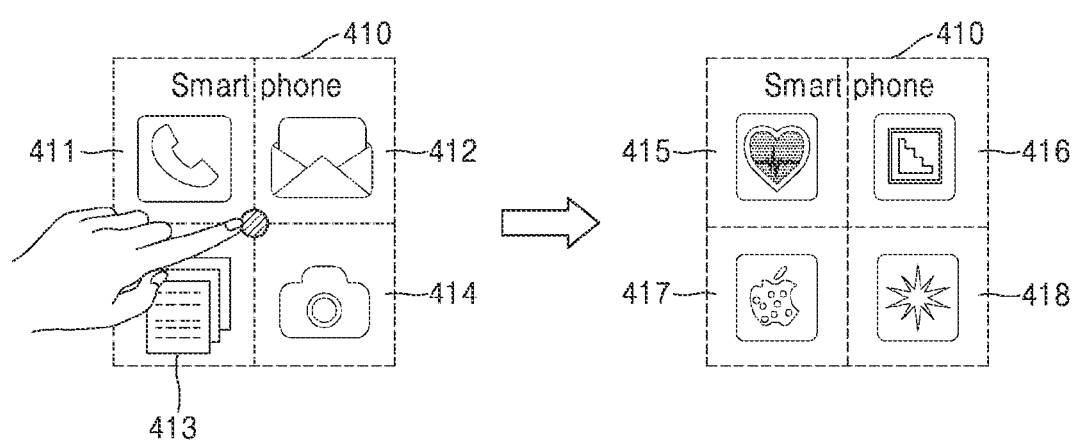
FIG. 6 is a diagram illustrating an example of a home screen in which icons are scrolled according to an exemplary embodiment.

FIG. 6 is a diagram illustrating an example of a home screen in which icons are scrolled according to an exemplary embodiment.

Referring to FIG. 6, a smart phone home screen 410 may be displayed in a graphics user interface 400. In this case, four application icons 411 to 414 may be displayed in the smart phone home screen 410. When a tap input is received at an intersection of grids in a home screen 410, application icons may be scrolled and four other application icons 415 to 418 that were not displayed to a user may be displayed in the home screen 410.

In one exemplary embodiment, when a tap input that is at the grid intersection in the home screen 410 is received, icons may be alternately displayed in units of four icons according to a user input. For example, referring to FIG. 6, when a tap input that is at the grid intersection in the home screen 410 is received, the icons 415 to 418 that were not displayed may be displayed instead of the icons 411 to 414 displayed in the home screen 410. The icons 415 to 418 may have been arranged subsequent to the icons 411 to 414.

Furthermore, when a tap input is received again at the grid intersection in the home screen 410, the icons 411 to 414 that were not displayed may be displayed instead of the icons 415 to 418.

In one exemplary embodiment, an input instructing to scroll a plurality of home screens (e.g., a smart phone home screen, a tablet home screen, and a laptop computer home screen) in a graphics user interface and an input instructing to scroll application icons in a home screen may be different gesture inputs.

For example, an input instructing to scroll a home screen may be a swipe input or a drag input, and an input instructing to scroll application icons in a home screen may be a tap input with respect to a non-icon region of the home screen. In one exemplary embodiment, the non-icon region of the home screen may be a grid intersection. Such a scroll input is not limited to the above gesture inputs and may be input using physical buttons of the wearable device 1000 or the like.

Figure 7A:
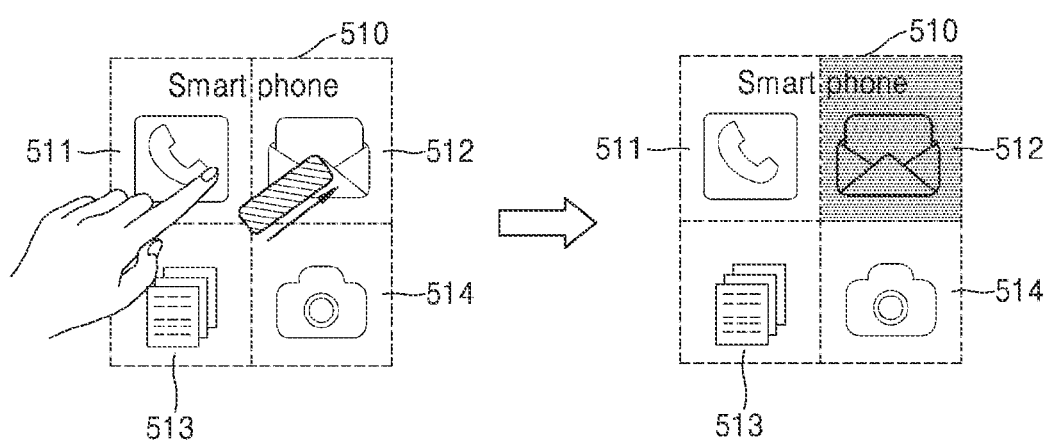
FIGS. 7A and 7B are diagrams illustrating an example of a home screen in which icons are selected according to exemplary embodiments.
Figure 7B:
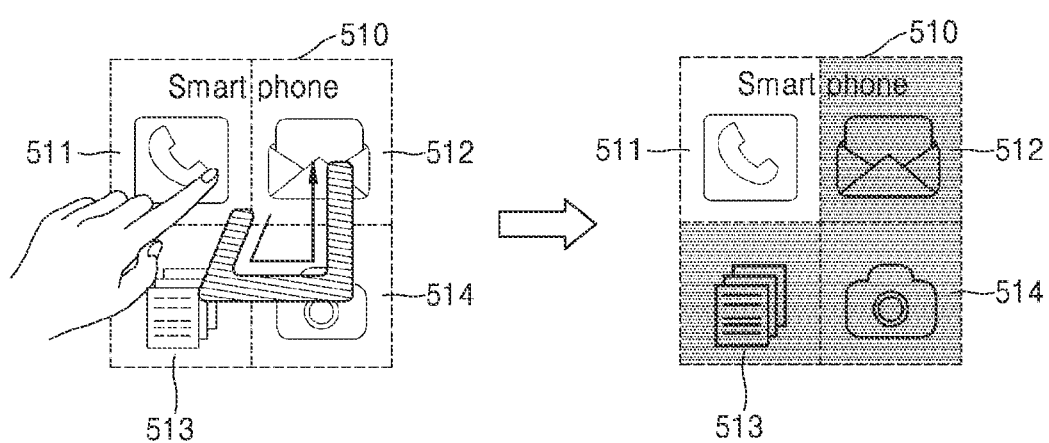

FIGS. 7A and 7B are diagrams illustrating an example of a home screen in which icons are selected according to exemplary embodiments.

Referring to FIGS. 7A and 7B, a smart phone home screen 510 may be divided into four regions by a horizontal-direction grid and a vertical-direction grid, and four application icons 511 to 514 may be arranged in the four regions of the smart phone home screen 510.

When receiving a drag input passing by at least one icon from among icons, starting from an grid intersection, the wearable device 1000 may select in a home screen the at least one icon that the drag input passes by.

As illustrated in FIG. 7A, when receiving a drag input passing by the upper right icon 512 among the four application icons 511 to 514, starting from the grid intersection, the wearable device 1000 may select the upper right icon 512.

As illustrated in FIG. 7B, when receiving a drag input passing by the lower left icon 513, the lower right icon 514, and the upper right icon 512 among the four application icons 511 to 514, starting from the grid intersection, the wearable device 1000 may select the icons 513, 514, and 512.

In one exemplary embodiment, when an application icon is selected in the wearable device 1000, various commands for the selected icon may be performed. For example, a command instructing to delete the selected icon, a command instructing to move the selected icon to another folder, a command instructing to rearrange the selected icon, etc may be performed in the wearable device 1000. However, exemplary embodiments are not limited thereto and other various commands may be performed.

Figure 8A:
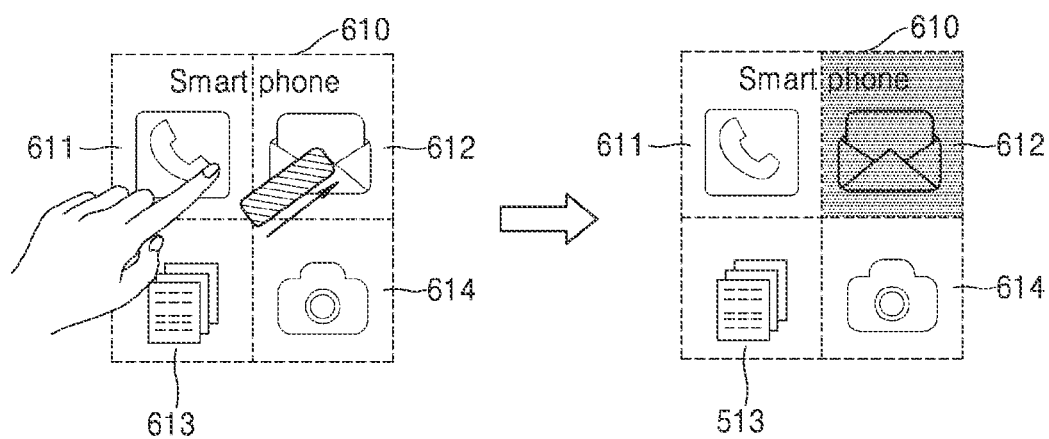
FIGS. 8A to 8C are diagrams illustrating an example of a home screen in which icons are rearranged according to exemplary embodiments.
Figure 8B:
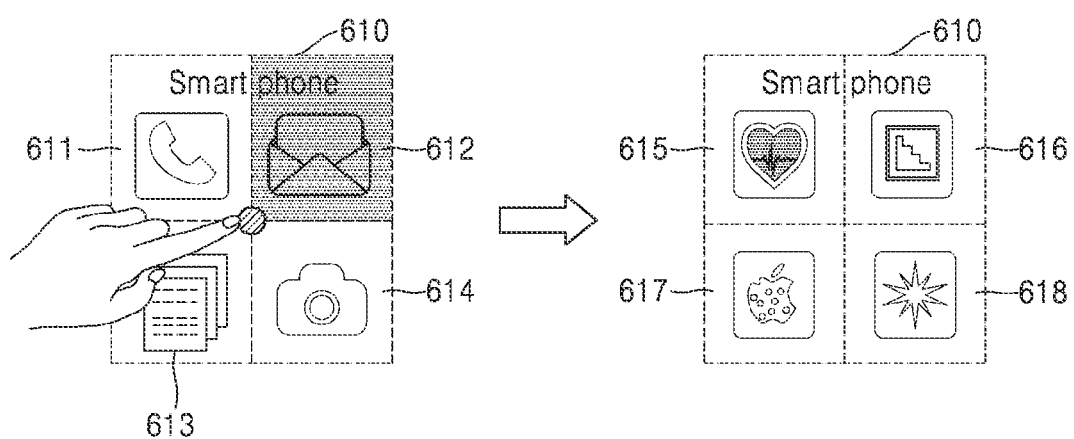
Figure 8C:
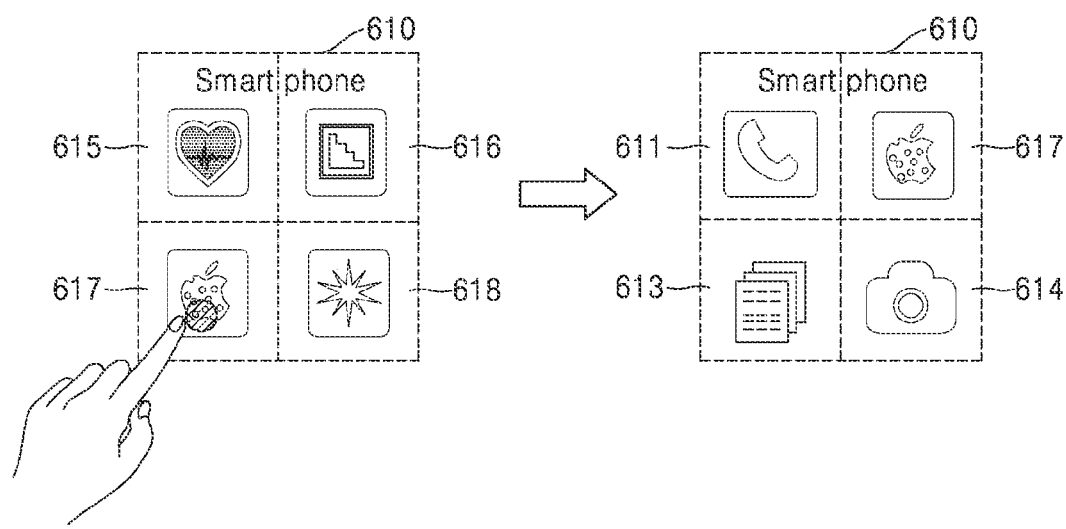

FIGS. 8A to 8C are diagrams illustrating an example of a home screen in which icons are rearranged according to exemplary embodiments.

Referring to FIGS. 8A to 8C, a smart phone home screen 610 may be divided into four regions by a horizontal-direction grid and a vertical-direction grid, and icons corresponding to applications to be driven in a smart phone may be arranged between the grids, i.e., in the four regions, based on a preset criterion. In one exemplary embodiment, when the number of application icons to be displayed a screen of the wearable device 1000 is four, the smart phone home screen 610 may be configured to that four application icons are scrolled at a time, e.g., once four application icons 611 to 614 are scrolled, and four other application icons 615 to 618 may be displayed.

Referring to FIGS. 8A to 8C, the upper right application icon 612 in the home screen 610 of FIG. 8A may be switched to the lower left application icon 617 in the home screen 610 of FIG. 8C.

When receiving a drag input passing by at least one icon among icons, starting from the grid intersection, the wearable device 1000 may perform a command instructing to select and rearrange in a home screen the at least one icon that the drag input passes by.

Referring to FIG. 8A, when receiving a drag input passing by the upper right application icon 612 among the four application icons 611 to 614, starting from the grid intersection, the wearable device 1000 may select and rearrange the upper right application icon 612.

In order to rearrange the selected application icon 612, the wearable device 1000 may additionally receive from a user an input regarding a location where the selected application icon 612 is to be rearranged. Here, the location where the selected application icon 612 is to be rearranged may be a location where another icon 617 has been arranged in the home screen 610.

In this case, the two icons 612 and 617 may be switched to each other.

Referring to FIG. 8B, when a tap input with respect to the grid intersection in the home screen 610 is received, the application icons 611 to 614 that are displayed to a user may be scrolled to cause that four other application icons 615 to 618 which were not displayed to the user, to be displayed in the home screen 610.

Referring to FIG. 8C, when a user input to the lower left icon 617 among the four application icons 615 to 618 that are scrolled to be displayed is received, the wearable device 1000 may switch the lower left icon 617 and the icon 612 selected in FIG. 8A with each other.

Since the two icons 612 and 617 are switched to each other, the icon 617 arranged in a relatively rear portion of the home screen 610 may be rearranged at an upper left end of a first page of the home screen 610 as illustrated in FIG. 8C.

In one exemplary embodiment, the switching of the two icons 612 and 617 to each other may be understood as changing an order in which the two icons 612 and 617 are arranged.

In one exemplary embodiment, when a location where the selected icon 612 is to be rearranged is the location where another icon 617 has been arranged in the home screen 710, the selected icon 612 may be rearranged on the location where the icon 617 has been arranged and the icon 617 may be rearranged after the rearranged icon 612.

In one exemplary embodiment, the selected icon 612 may be deleted from the home screen 610 and the icon 617 may be rearranged on the location where the selected icon 612 has been arranged.

FIGS. 9A to 9E are diagrams illustrating an example of a home screen in which icons are rearranged according to exemplary embodiments.

Referring to FIGS. 9A to 9E, a smart phone home screen 710 may be divided into four regions by a horizontal-direction grid and a vertical-direction grid, and icons 711 to 722 corresponding to applications to be driven in a smart phone may be arranged between the grids, that is, in the four regions, based on a preset criterion. In this case, when the number of application icons to be displayed in a screen of the wearable device 1000 is four, the smart phone home screen 710 may be configured such that four application icons are scrolled, e.g., once the four application icons 711 to 714 are scrolled, four other application icons 715 to 718 may be displayed. Also, once the four application icons 715 to 718 are scrolled, four other application icons 719 to 722 may be displayed.

Figure 9A:
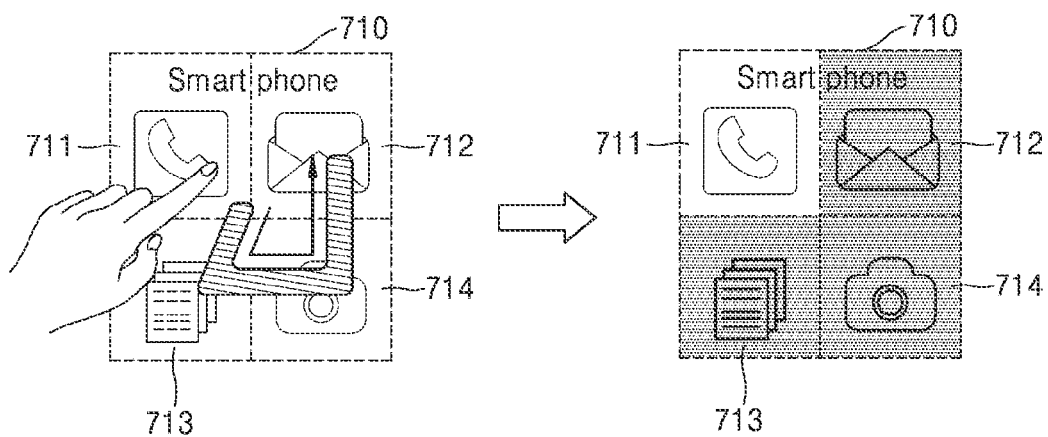
FIGS. 9A to 9E are diagrams illustrating an example of a home screen in which icons are rearranged according to other exemplary embodiments.
Figure 9B:
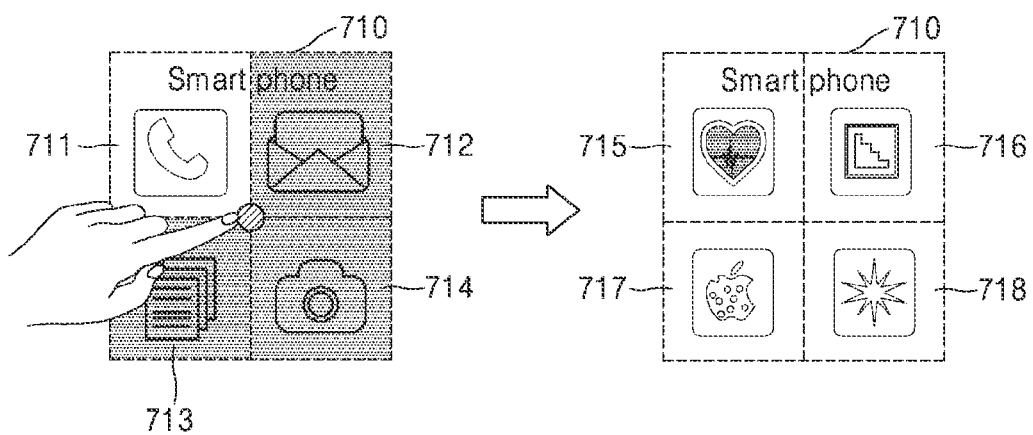
Figure 9C:
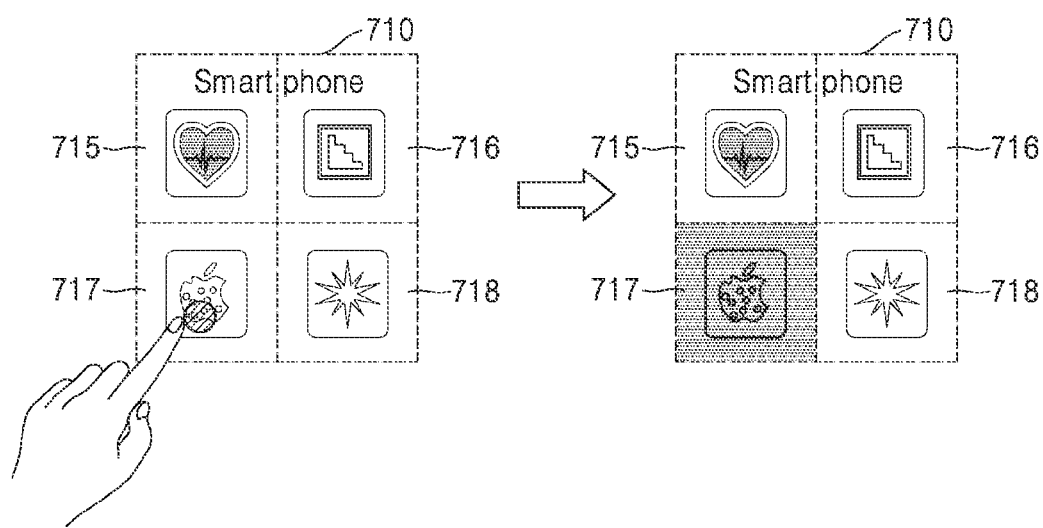
Figure 9D:
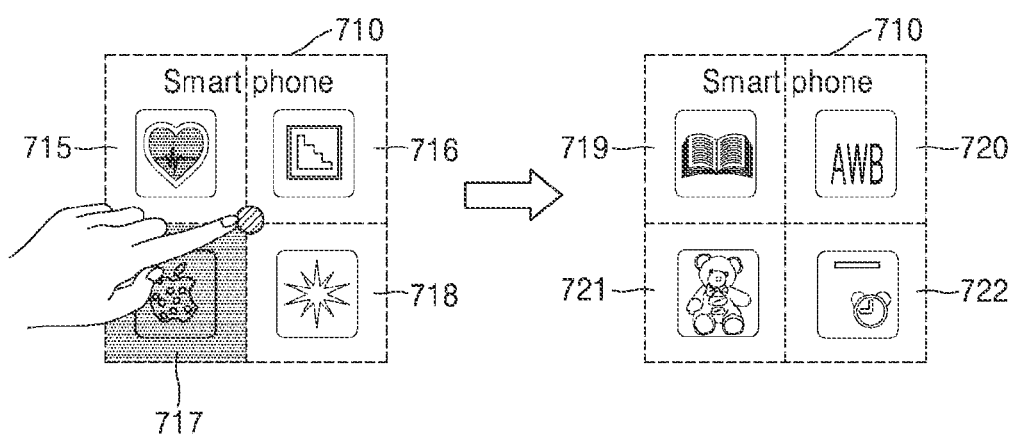
Figure 9E:
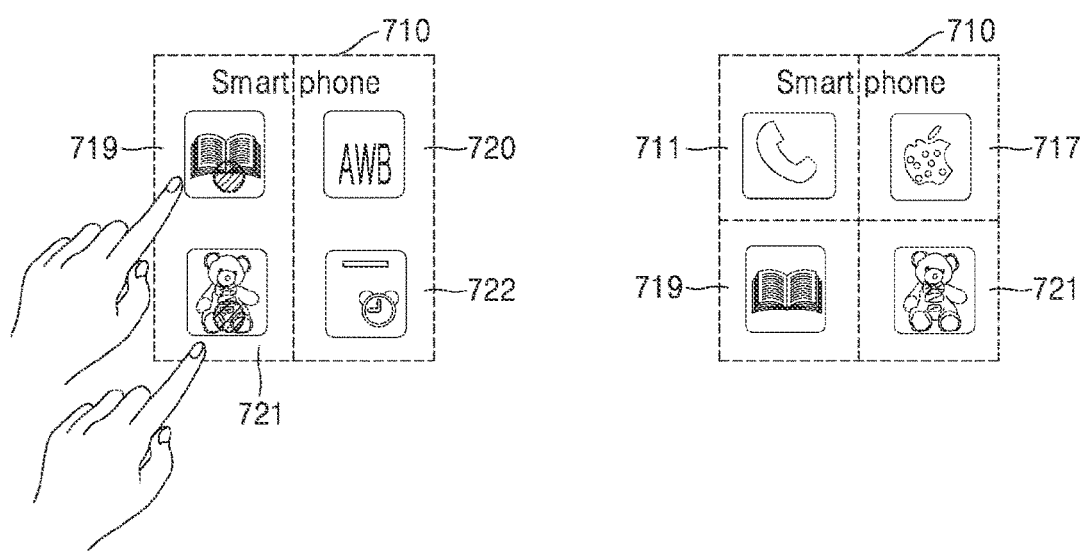

Referring to FIGS. 9A to 9E, a lower left application icon 713, a lower right application icon 714, and an upper right application icon 712 in the smart phone home screen 710 of FIG. 9A may be switched to the lower left application icon 717 in the smart phone home screen 710 of FIG. 9D and the upper left application icons 719 and the lower left application icon 721 in the smart phone home screen 710 of FIG. 9E, respectively.

When receiving a drag input passing by at least one icon from among icons, starting from the grid intersection, the wearable device 1000 may perform a command instructing to select and rearrange in the home screen 710 the at least one icon that the drag input passes by.

As illustrated in FIG. 9A, when receiving a drag input passing by the lower left application icon 713, the lower right application icon 714, and the upper right application icon 712 among the four application icons 711 to 714, starting from the grid intersection, the wearable device 1000 may select and rearrange the application icons 713, 714, and 712.

When the application icons 713, 714, and 712 are selected and rearranged, the wearable device 1000 may additionally receive a plurality of inputs regarding locations where the selected icons 713, 714, and 712 are to be rearranged.

The locations where the selected icons 713, 714, and 712 are to be rearranged may be locations where other application icons 717, 719, and 721 have been arranged in the home screen 710.

In this case, the selected plurality of icons 713, 714, and 712 may be switched to the other icons 717, 719, and 721, respectively.

Referring to FIG. 9B, when a tap input with respect to the grid intersection in the home screen 710 is received, the application icons 711 to 714 may be scrolled to cause four other application icons 715 to 718, which were not displayed to a user, to be displayed in the home screen 710.

Referring to FIG. 9C, when user input with respect to the lower left application icon 717 among the displayed four application icons 715 to 718 is received, the wearable device 1000 may select the lower left application icon 717 to be switched with one of the icons 713, 714, and 712 selected in FIG. 9A.

Referring to FIG. 9D, when a tap input with respect to the grid intersection in the home screen 710 is received, the application icons 715 to 718 may be scrolled to cause the four other application icons 719 to 722, which were not displayed to a user, to be displayed in the home screen 710.

Referring to FIG. 9E, when a user input with respect to the upper left application icon 719 and the lower left application icon 722 among the displayed four application icons 719 to 722 is received, the wearable device 1000 may select the upper left application icon 719 and the lower left application icon 722 to be switched with two of the application icons 713, 714, and 712 selected in FIG. 9A.

When all the application icons 717, 719, and 722 to be switched with the selected icons 713, 714, and 712 are selected, the wearable device 1000 may switch the selected icons 713, 714, and 712 and the icons 717, 719, and 722 to one another as illustrated FIG. 9E.

By switching application icons with one another, the application icons 717, 719, and 722 that have been arranged in relatively rear portions of the home screen 710 may be rearranged on an upper right end, a lower left end, and a lower right end of the first page of the home screen 710, respectively.

In one exemplary embodiment, when locations where the selected application icons 713, 714, and 712 are to be rearranged are the locations where the icons 717, 719, and 721 have been arranged in the home screen 710, the selected application icons 713, 714, and 712 are rearranged on the locations and the application icons 717, 719, and 721 may be arranged after the rearranged application icons 713, 714, and 712.

In one exemplary embodiment, the switching of icons may be understood as changing an order in which the icons are arranged.

In one exemplary embodiment, selected icons may be deleted from the home screen 710 and other icons may be rearranged on the locations where the selected icons were arranged.

Figure 10A:
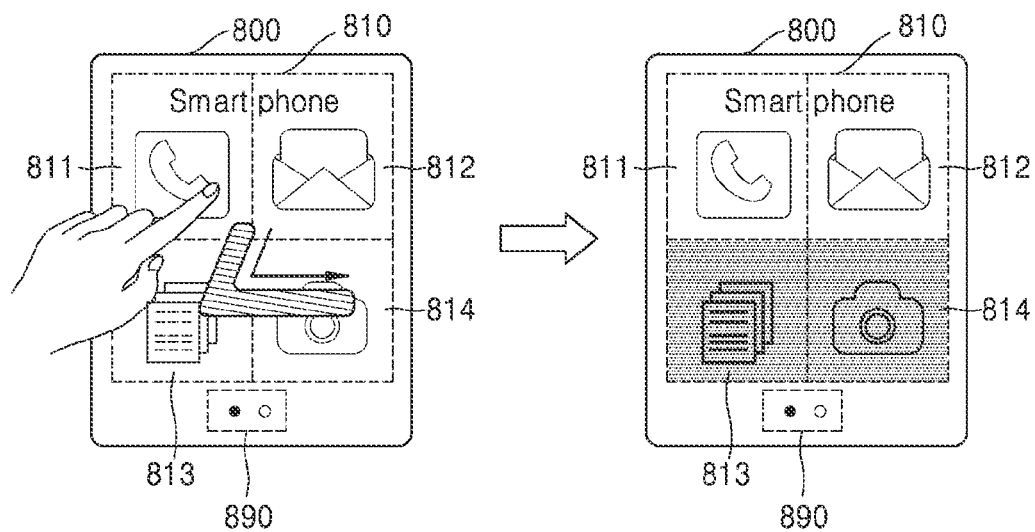
FIGS. 10A to 10C are diagrams illustrating an example of a plurality of home screens in which icons are rearranged according to exemplary embodiments.
Figure 10B:
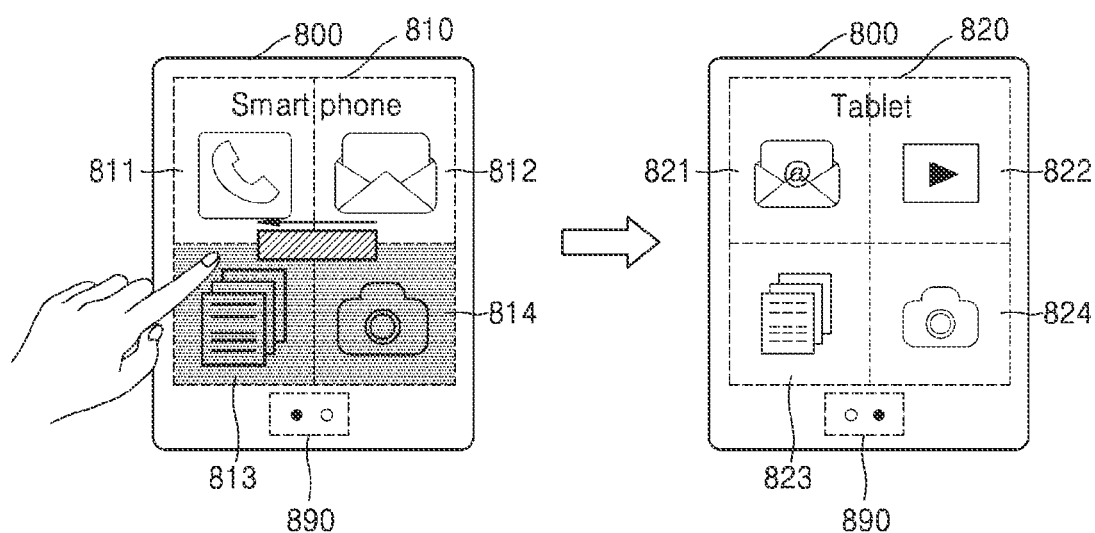
Figure 10C:
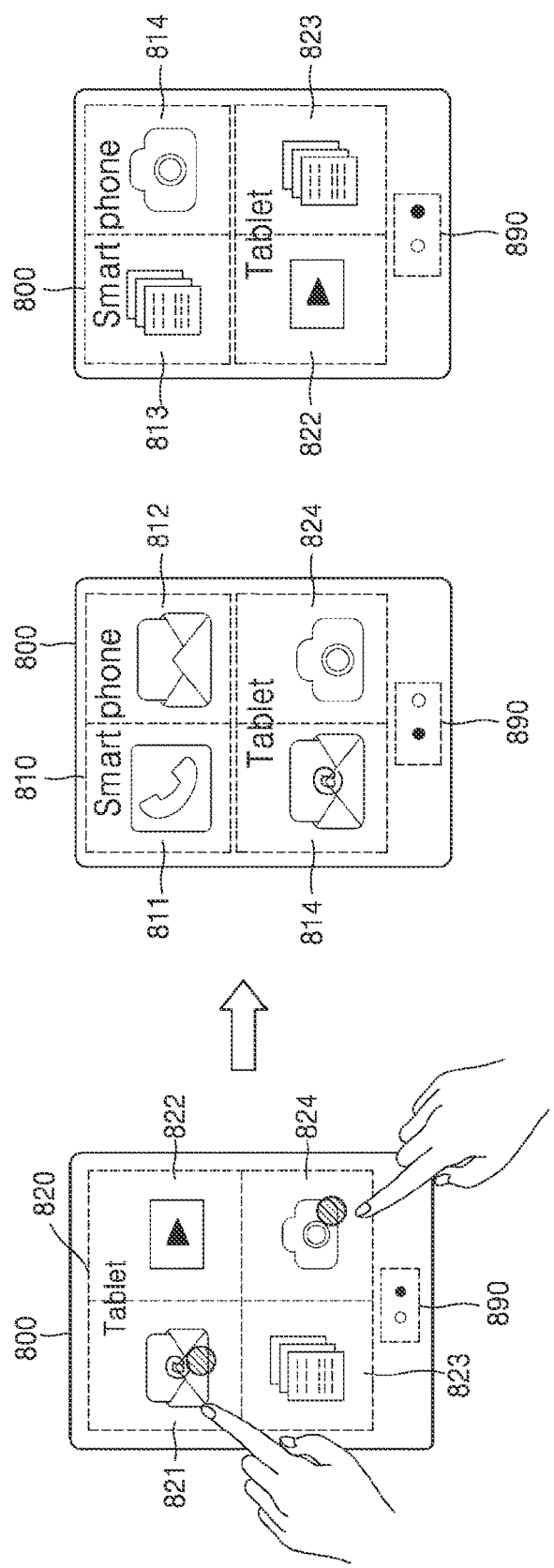

FIGS. 10A to 10C are diagrams illustrating an example of a plurality of home screens in which icons are rearranged according to exemplary embodiments.

Referring to FIGS. 10A to 10C, a graphics user interface 800 includes a smart phone home screen 810 and a tablet home screen 820. The graphics user interface 800 may include two pages, and the smart phone home screen 810 and the tablet home screen 820 may be arranged on the two pages, respectively.

Each of the smart phone home screen 810 and the tablet home screen 820 may be divided into four regions by a horizontal-direction grid and a vertical-direction grid, and icons corresponding to applications to be driven in a smart phone and a tablet computer may be arranged between the grids, that is, in the four regions of each of the smart phone home screen 810 and the tablet home screen 820, based on a preset criterion.

Referring to FIGS. 10A to 10C, a lower left application icon 813 and a lower right application icon 814 in the smart phone home screen 810 of FIG. 10A are switched to an upper left application icon 821 and a lower right application icon 824 in the tablet home screen 820 of FIG. 10C.

When receiving a drag input passing by at least one icon from among icons, starting from the grid intersection, the wearable device 1000 may perform a command instructing to select and rearrange in a home screen the at least one icon that the drag input passes by.

Referring to FIG. 10A, when receiving a drag input passing by the lower left application icon 813 and the lower right application icon 814 among the four application icons 811 to 814, starting from the grid intersection, the wearable device 1000 may select and rearrange the icons 813 and 814.

As illustrated in FIG. 10A, when the icons 813 and 814 are selected and rearranged, a plurality of inputs regarding locations where the selected icons 813 and 814 are to be rearranged may be additionally received. The locations where the selected icons 813 and 814 are to be rearranged may be in the other tablet home screen 820.

When the locations where the selected icons 813 and 814 are to be rearranged are in the other tablet home screen 820, the wearable device 1000 may be configured to display the two home screens 810 and 820 together and the icons 813 and 814 from the smart phone home screen 810 may be displayed in the tablet home screen 820.

As illustrated in FIG. 10B, when a swipe input is input to the wearable device 1000 in a horizontal direction, the smart phone home screen 810 may be scrolled and the tablet home screen 820 may be displayed on the wearable device 1000.

As illustrated in FIG. 10C, when the tablet home screen 820 is displayed and a user input with respect to the upper left icon 821 and the lower right icon 824 in the tablet home screen 820 is received, the wearable device 1000 may display the two home screens 810 and 820 together. Furthermore, the icons 813 and 814 selected in the smart phone home screen 810 of FIG. 10A and the icons 821 and 824 selected in the tablet home screen 820 of FIG. 10C may be switched to each other as illustrated in FIG. 10C.

In one exemplary embodiment, the icons 813 and 814 selected in the smart phone home screen 810 may be deleted and only the icons 821 and 824 selected in the tablet home screen 820 may be rearranged.

FIGS. 11A to 11D are diagrams illustrating methods of mediating between the plurality of electronic devices 2000 according to exemplary embodiments.

Referring to FIGS. 11A to 11D, the wearable device 1000 mediates between a smart phone and a laptop computer to copy a 'music' folder stored in an archive of the smart phone to an archive of the laptop computer.

Here, the term "archive" means a preset folder of each of the electronic devices 2000, in which a user may store files such as various video, music, and document files, etc.

Figure 11A:
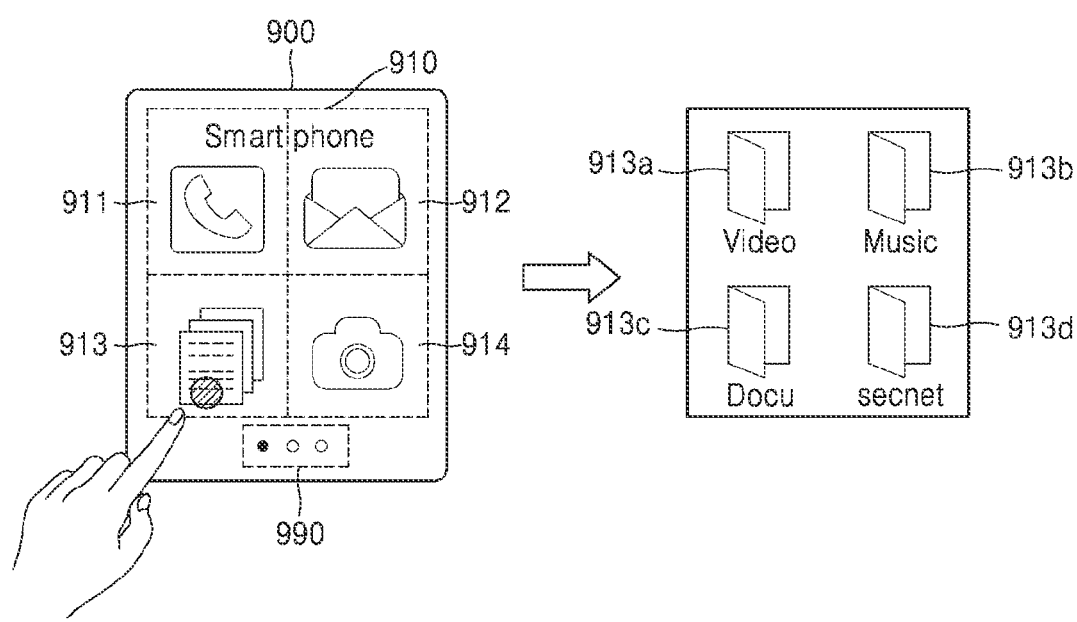
FIGS. 11A to 11E are diagrams illustrating methods of mediating between a plurality of electronic devices according to exemplary embodiments.

Referring to FIG. 11A, when a command instructing to execute an archive icon 913 in a smart phone home screen 910 is received, the wearable device 1000 may access an archive of a smart phone. A 'video' folder 913a, a 'music' folder 913b, a 'Docu' folder 913c, and a 'secret' folder 913d may be stored in the accessed archive of the smart phone, and displayed on the wearable device 1000.

Figure 11B:
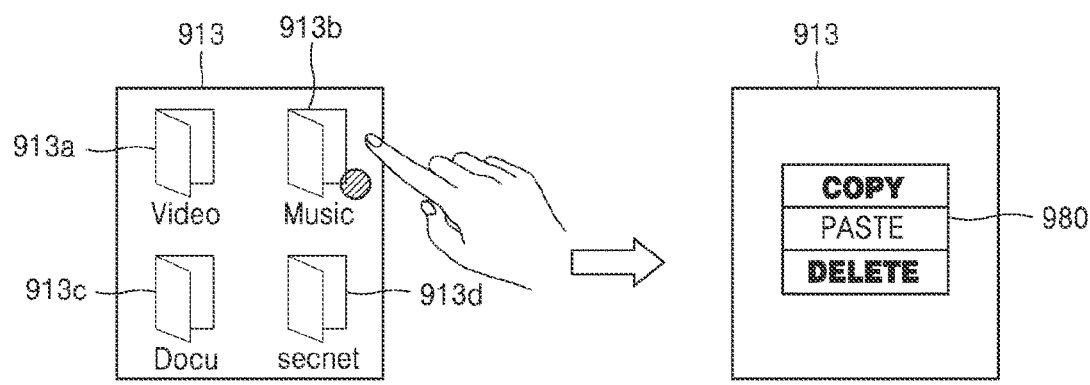

As illustrated in FIG. 11B, when a user input with respect to the 'music' folder 913b is received, the wearable device 1000 may perform a command related to the 'music' folder 913b.

The command related to the 'music' folder 913b may be, but is not limited to, a command instructing to open the 'music' folder 913b or to generate a menu window 980 for the 'music' folder 913b. The commands may be embodied using different gesture inputs. For example, a folder may be opened to display sub-folders thereof when a tap input with respect to the folder is received, and a menu window for the folder may be generated when a long-tap input with respect to the folder is received.

Referring to FIG. 11B, when a long-tap input regarding the 'music' folder 913b is received, a menu window 980 for the 'music' folder 913b may be generated. A user may select a desired command from the menu window 980. If the user selects a 'COPY' command and determines a location to which the 'music' folder 913b is to be copied, the 'music' folder 913b is copied to the location.

In this case, the location may be determined within the same electronic device but may be determined within a different electronic device.

Figure 11C:
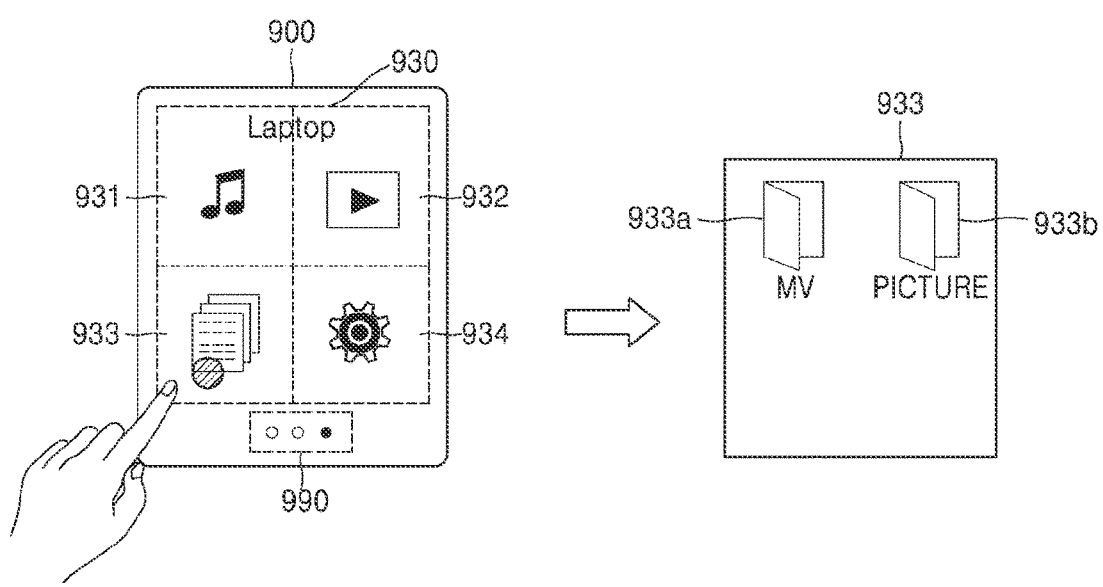

After the user selects the 'COPY' command, when a command instructing to execute an archive icon 933 of a laptop computer home screen 930 is received as illustrated in FIG. 11C, the wearable device 1000 may access an archive of a laptop computer.

Referring to FIG. 11C, an 'MV' folder 933a and a 'picture' folder 933b may be stored in the accessed archive of the laptop computer, and displayed on the wearable device 1000.

Figure 11D:
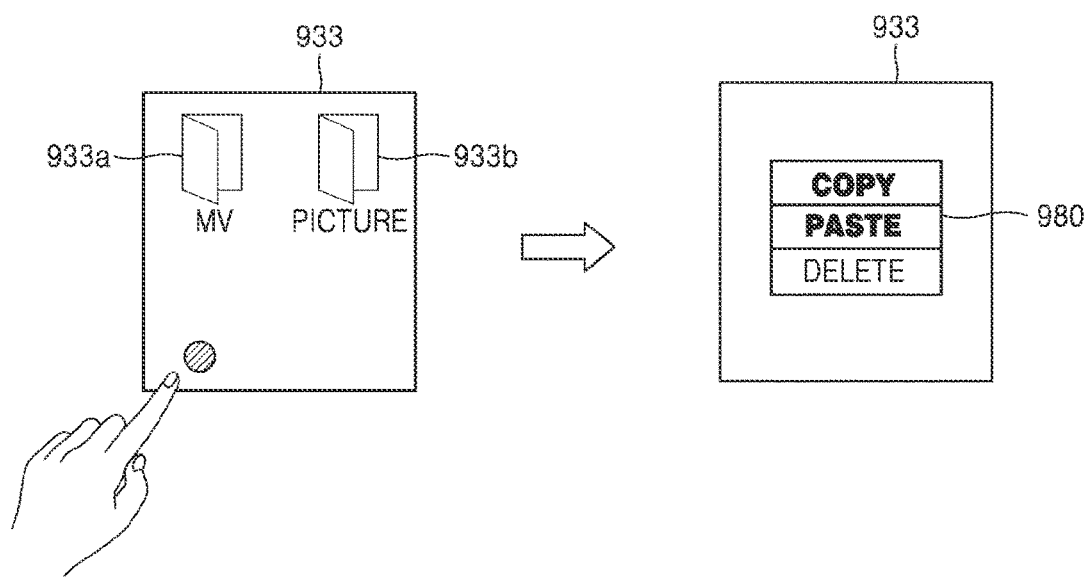
Figure 11E:
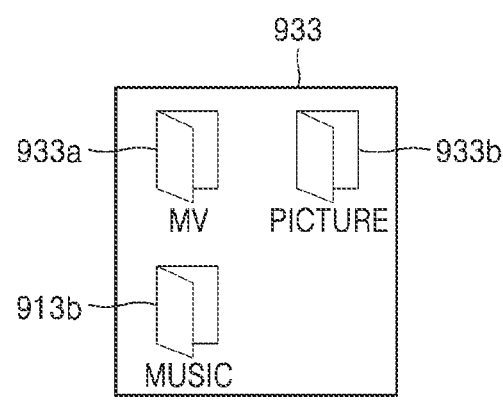

Referring to FIG. 11D, when a user input with respect to an empty region of the archive of the laptop computer is received, the menu window 980 for the archive may be generated. A user may select a desired command from the menu window 980. If the user selects a 'PASTE' command, the 'music' folder 913b which is a target of the 'COPY' command is copied to the archive of the laptop computer as illustrated in FIG. 11B.

In this case, in order to directly transmit the 'music' folder 913b from the smart phone to the laptop computer, the wearable device 1000 may transmit metadata of the 'music' folder 913b of the smart phone to the laptop computer and transmit metadata of the archive of the laptop computer to the smart phone.

In one exemplary embodiment, the 'music' folder 913b may be first transmitted from the smart phone to the wearable device 1000 and then transmitted from the wearable device 1000 to the laptop computer. However, exemplary embodiments are not limited thereto and the 'music' folder 913b may be directly transmitted from the smart phone to the laptop computer as described above or may be transmitted via a separate cloud server, etc.

Figure 12:
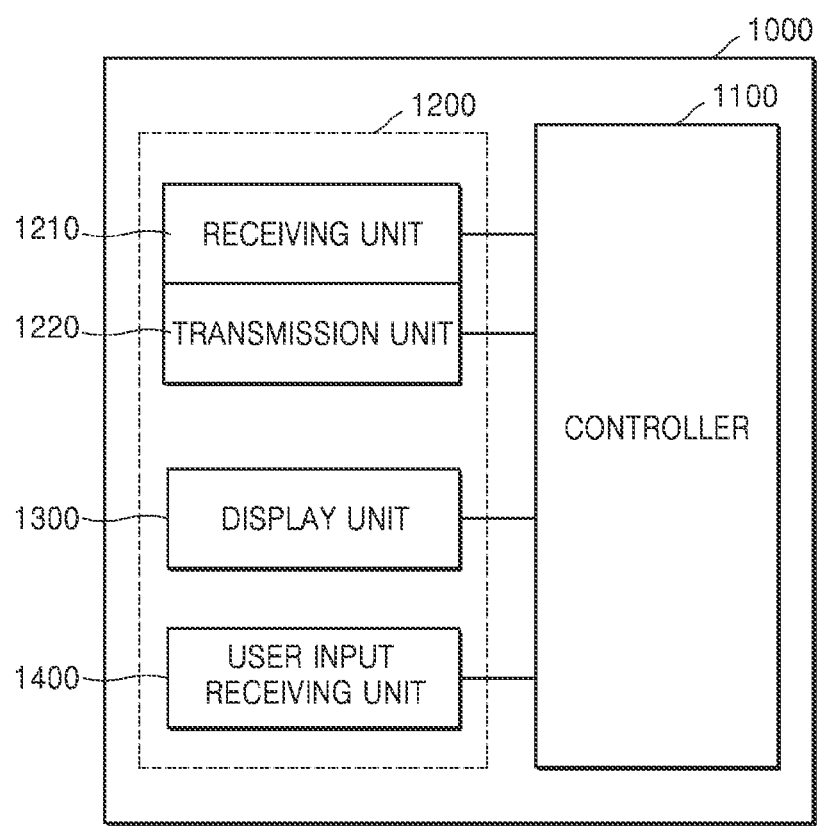
FIG. 12 is a block diagram of a wearable device according to one exemplary embodiment.

FIG. 12 is a block diagram of a wearable device 1000 according to one exemplary embodiment.

Referring to FIG. 12, the wearable device 1000 according to an exemplary embodiment may include a controller 1100, a communication unit 1200 that includes a receiving unit 1210, and a transmission unit 1220, a display unit 1300, and a user input unit 1400. However, all the elements illustrated in FIG. 12 are not indispensable elements of the wearable device 1000, and thus the wearable device 1000 may further include other elements or include only some of the elements illustrated in FIG. 12.

In general, the controller 1100 controls overall operations of the wearable device 1000. For example, the controller 1100 may execute a program stored in the wearable device 1000 to generally control the elements of the wearable device 1000.

The communication unit 1200 may include the receiving unit 1210 and the transmission unit 1220. The communication unit 1200 may include at least one element for establishing communication between electronic devices and the wearable device 1000, between electronic devices each other, or between electronic devices and a server.

The communication unit 1200 may transmit/receive data using a short-range communication manner, a wide-range communication manner, a value-added communication manner, or a satellite communication manner.

The receiving unit 1210 and the transmission unit 1220 are examples provided for convenience of explanation, and all operations of the receiving unit 1210 and the transmission unit 1220 may be performed by the communication unit 1200.

The communication unit 1200 may enable the wearable device 1000 and an electronic device 2000 to be paired with each other.

The display unit 1300 displays or outputs information processed by the wearable device 1000.

The display unit 1300 may display at least a portion of a graphics user interface that includes a plurality of home screens corresponding to a plurality of electronic devices.

In one exemplary embodiment, when the display unit 1300 and a touch pad form a touch screen together in a layered structure, the display unit 1300 may be used as not only an output device but also an input device. The display unit 1300 may include at least one from among a liquid crystal display, a thin-film transistor-liquid crystal display, an organic light-emitting diode, a flexible display, a three-dimensional (3D) display, and an electrophoretic display.

The user input unit 1400 may receive a user input.

The user input unit 1400 may receive a user input related to a graphics user interface.

In one exemplary embodiment, the user input unit 1400 may be a key pad, a dome switch, a touch pad (including a contact type capacitive touch pad, a pressure-type resistive overlay touch pad, an infrared sensor type touch pad, a surface ultrasonic conductive touch pad, an integral-equation tension measuring type touch pad, a piezo-effect type touch pad, etc.), a jog wheel, a jog switch, etc, but is not limited thereto.

The controller 1100 may control the communication unit 1200 to pair a plurality of electronic devices with the wearable device 1000.

The controller 1100 may control the display unit 1300 to display at least a portion of a graphics user interface that includes a plurality of home screens corresponding to a plurality of electronic devices. The graphics user interface includes the plurality of home screens that correspond to the plurality of electronic devices, respectively.

The controller 1100 may control the graphics user interface based on a user input received with respect to the graphics user interface via the user input receiving unit 1400.

In one exemplary embodiment, the controller 1100 may arrange the home screens in the graphics user interface in an order that has been determined beforehand or that has been arbitrarily set by a user.

In one exemplary embodiment, the controller 1100 may remove from the graphics user interface a home screen corresponding to an electronic device unpaired from the wearable device 1000.

In one exemplary embodiment, even if a pairing between the wearable device 1000 and an electronic device is canceled, when the electronic device may indirectly communicate with the wearable device 1000 via an additional wire/wireless network, i.e., when a user may continuously perform an operation on the electronic device via the wearable device 1000, the controller 1100 may not remove the home screen corresponding to the electronic device from the graphics user interface.

In one exemplary embodiment, when the wearable device 1000 and an electronic device are paired with each other again, the controller 1100 may inform a user of this fact via a notification.

In one exemplary embodiment, the controller 1100 may insert a home screen, which was removed from the graphics user interface, again into the graphics user interface.

In one exemplary embodiment, the controller 1100 may determine an order in which a plurality of home screens are arranged in the graphics user interface based on a preset criterion.

In one exemplary embodiment, the controller 1100 may determine an order in which a plurality of home screens are arranged in the graphics user interface according to electronic devices.

In one exemplary embodiment, the controller 1100 may determine an order in which a plurality of home screens are arranged in the graphics user interface, based on a proximity between each of a plurality of electronic devices and the wearable device 1000. In this case, the proximity between each of a plurality of electronic devices and the wearable device 1000 may be determined based on the intensity of a pairing signal between each of the plurality of electronic devices and the wearable device 1000.

In one exemplary embodiment, the controller 1100 may determine an order in which a plurality of home screens are arranged in the graphics user interface based on a location of the wearable device 1000. In this case, the location of the wearable device 1000 may be checked by using a sensor, e.g., a GPS, installed in the wearable device 1000.

In one exemplary embodiment, the controller 1100 may determine an order in which a plurality of home screens are arranged in the graphics user interface, based on the reliabilities of the plurality of electronic devices. The reliabilities of the plurality of electronic devices may be determined based on various criteria.

In one exemplary embodiment, the controller 1100 may determine an order in which a plurality of home screens are arranged in the graphics user interface, based on a user's usage pattern of each of the plurality of electronic devices.

In one exemplary embodiment, the controller 1100 may provide a user with notifications received via the plurality of electronic device by using the notification graphics user interface.

In one exemplary embodiment, the controller 1100 may determine an order in which a plurality of home screens are arranged in the graphics user interface, based on a chronological order of alarms pushed from the plurality of electronic devices to the wearable device 1000. The chronological order of the alarms pushed from the plurality of electronic devices to the wearable device 1000 may be times when the alarms are pushed to the wearable device 1000, respectively, but is not limited thereto and may be times measured based on other various criteria, e.g., times when the alarms arrived at the plurality of electronic devices.

In general, alarm messages pushed to an electronic device are arranged in the electronic device in a chronological order. Thus, in order that a user may also experience same user experience on the wearable device 1000, in one exemplary embodiment, the controller 1100 may arrange a home screen corresponding to an electronic device which pushed an alarm relatively later before home screens corresponding to other electronic devices which pushed an alarm relatively earlier.

In one exemplary embodiment, the controller 1100 may arrange icons of applications, which to be driven in an electronic device, between grids, i.e., in four regions of a home screen, based on a preset criterion.

In one exemplary embodiment, the controller 1100 may arrange icons of applications in a home screen, based on an order in which the icons of the applications are arranged in a predetermined region of an electronic device.

In one exemplary embodiment, the controller 1100 may arrange icons of applications in a home screen, based on a frequency of an event that the applications are driven in the electronic device. Here, the frequency of an event that the applications are driven may be a frequency of an event that the applications are driven in the electronic device without the wearable device 1000, a frequency of an event that the applications are driven in the electronic device via the wearable device 1000, or a combination thereof.

In one exemplary embodiment, when receiving a drag input passing by at least one among icons, starting from the grid intersection is received, the controller 1100 may select in a home screen the at least one icon that the drag input passes by.

In one exemplary embodiment, when an application icon is selected in the wearable device 1000, the controller 1100 may perform various commands on the selected application icon. For example, a command instructing to delete the selected application icon, a command instructing to move the selected application icon to another folder, a command instructing to rearrange the selected application icon, etc may be performed in the wearable device 1000. However, exemplary embodiments are not limited thereto and other various commands may be performed.

In one exemplary embodiment, when receiving a drag input passing by at least one among icons, starting from the grid intersection is received, the controller 1100 may perform a command instructing to select and rearrange in a home screen the least one icon that the drag input passes by.

In one exemplary embodiment, the controller 1100 may control the communication unit 1300 to mediate between a plurality of electronic devices. The controller 1100 may mediate between the plurality of electronic devices by receiving metadata from one of the plurality of electronic devices and transmitting the metadata to another electronic device via the communication unit 1300.

In one exemplary embodiment, the controller 1100 may control the communication unit 1300 to transmit data received from one electronic device to another electronic device via.

Figure 13:
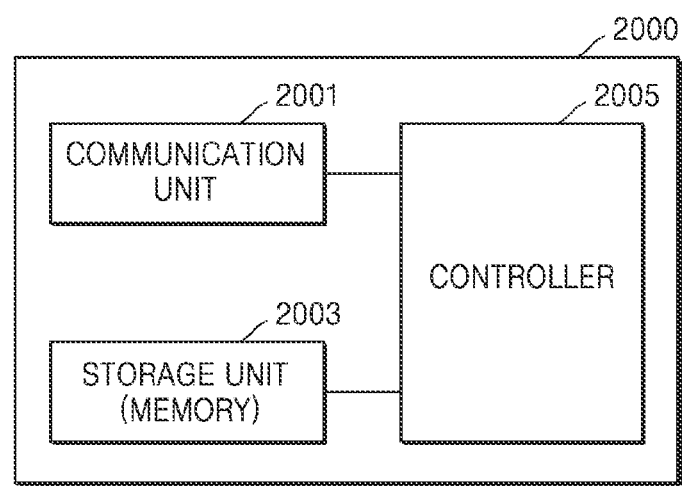
FIG. 13 is a block diagram of an electronic device according to one exemplary embodiment.

FIG. 13 is a block diagram of an electronic device 2000 according to one exemplary embodiment.

Referring to FIG. 13, the electronic device 2000 according to an exemplary embodiment may include a communication unit 2001, a storage unit (memory) 2003, and a controller 2005. However, all the elements illustrated in FIG. 13 are not indispensable elements of the electronic device 2000. The electronic device 2000 may further include other elements or include only some of the elements illustrated in FIG. 13.

The communication unit 2001 may enable the electronic device 2000 to be paired with the wearable device 1000.

When the electronic device 2000 and the wearable device 1000 are paired with each other, data may be transmitted therebetween.

The storage unit 2003 may include a memory. The storage unit 2003 may store information received via the wearable device 1000.

In general, the controller 2005 controls overall operations of the wearable device 1000. For example, the controller 2005 may generally control the elements of the electronic device 2000 by executing a program stored in the electronic device 2000.

The controller 2005 may perform various commands received from the wearable device 1000 via the communication unit 2001.

Figure 14:
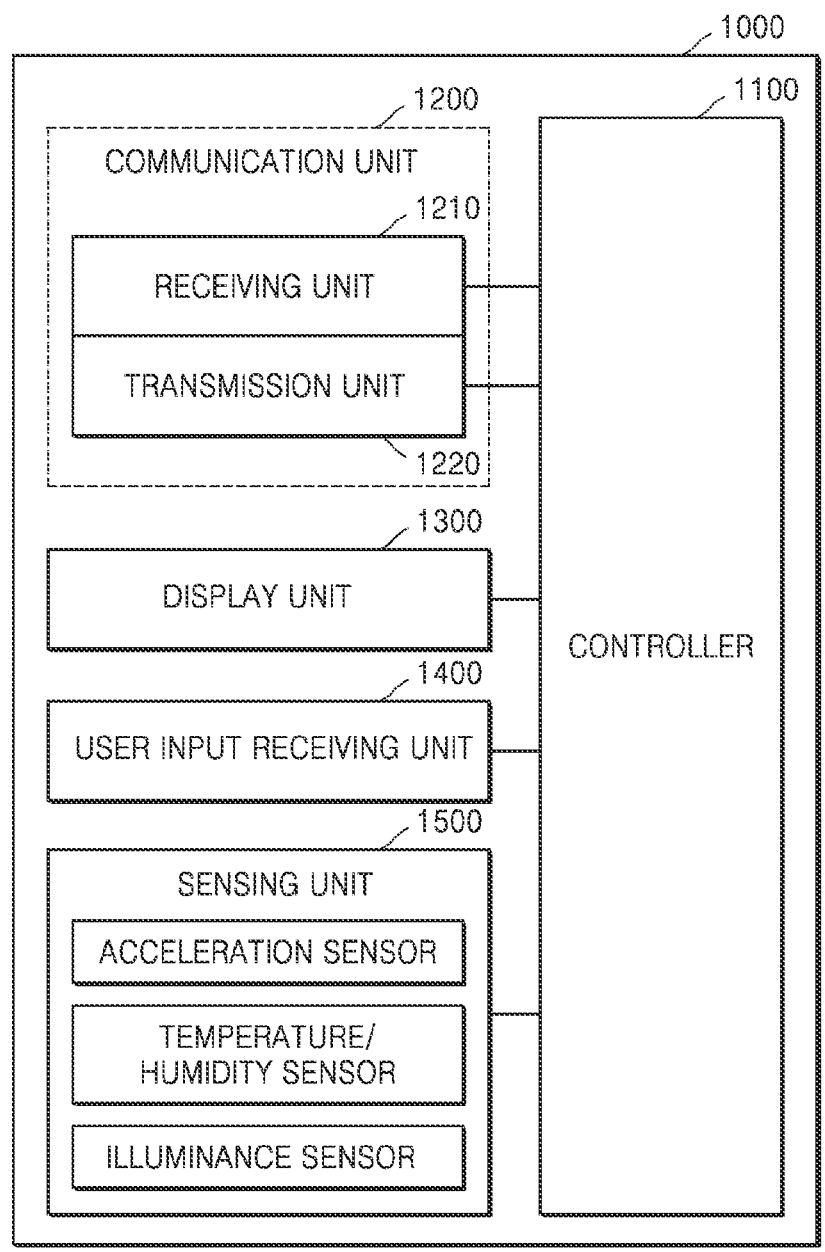
FIG. 14 is a detailed block diagram of a wearable device according to one exemplary embodiment.

FIG. 14 is a detailed block diagram of a wearable device 1000 according to one exemplary embodiment.

Referring to FIG. 14, the wearable device 1000 according to an exemplary embodiment may include a controller 1100, a communication unit 1200 that includes a receiving unit 1210 and a transmission unit 1220, a display unit 1300, a user input receiving unit 1400, and a sensing unit 1500.

The communication unit 1200 that includes the receiving unit 1210 and the transmission unit 1220, and the controller 1100 are as described above and are thus not described in detail here. In one exemplary embodiment, the controller 1100 may control the elements of an electronic device to perform operations of the electronic device described above.

The user input receiving unit 1400 may determine whether a user input is received, based on predetermined information obtained using the sensing unit 1500.

The sensing unit 1500 may include at least one from among an acceleration sensor, a temperature/humidity sensor, and an illuminance sensor but is not limited thereto. The acceleration sensor may obtain information regarding a user's motion. The temperature/humidity sensor and an illuminance sensor may obtain bio-signal information of a user, e.g., pulse waves, body heat, etc.

In one exemplary embodiment, the wearable device 1000 may include a memory. The memory may include at least one storage medium from among a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), an electrically erasable programmable ROM (EEPROM), a programmable ROM (PROM), a magnetic memory, a magnetic disk, and an optical disk.

In one exemplary embodiment, the wearable device 1000 may further include a sound output unit that outputs an audio signal, and a vibration motor that outputs a vibration signal.

Figure 15:
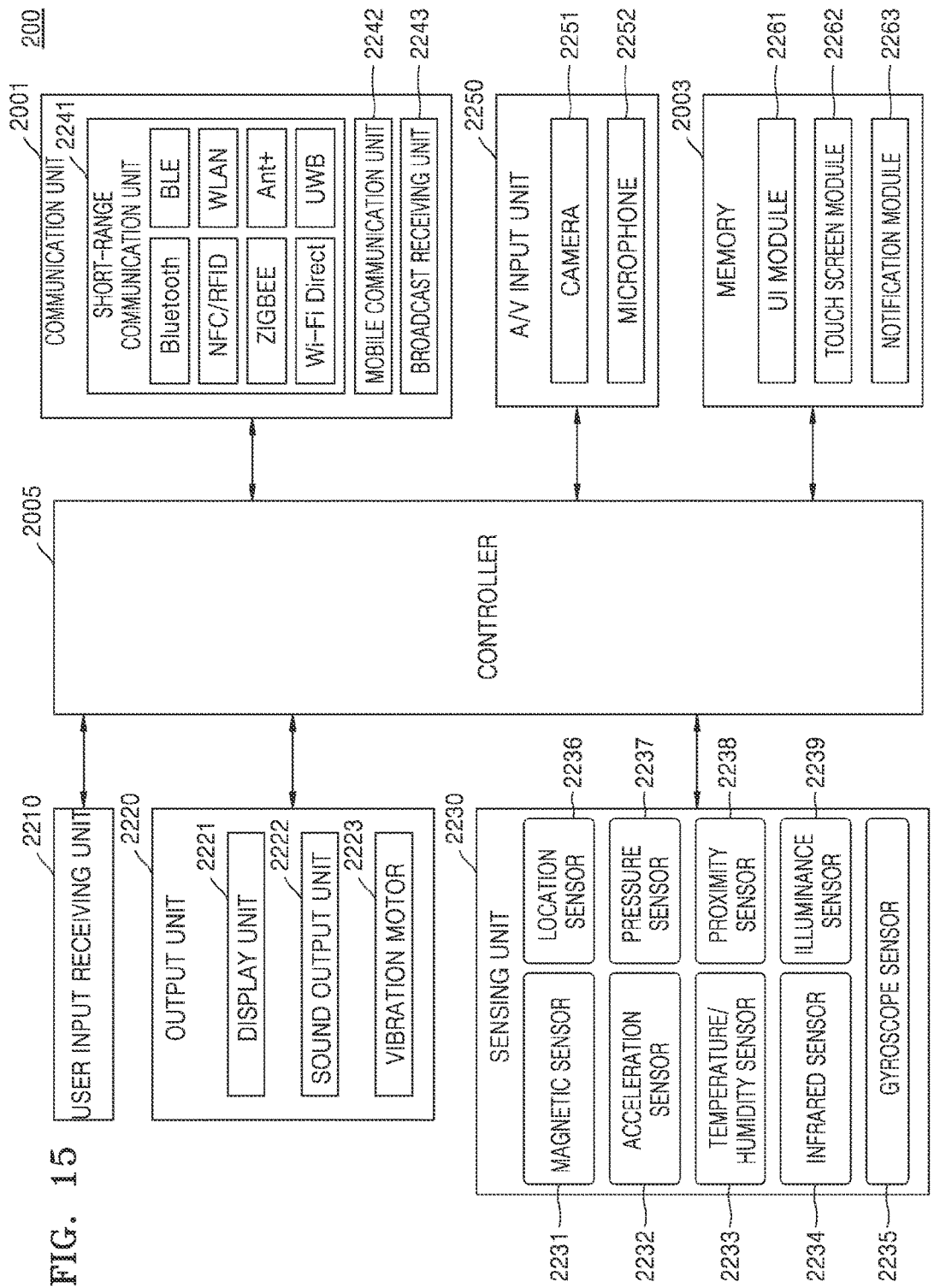
FIG. 15 is a detailed block diagram of an electronic device according to one exemplary embodiment.

FIG. 15 is a detailed block diagram of an electronic device 2000 according to one exemplary embodiment.

Referring to FIG. 15, the electronic device 2000 according to an exemplary embodiment may include a communication unit 2001, a storage unit (memory) 2003, and a controller 2005, and may further include a user input receiving unit 2210, an output unit 2220, a sensing unit 2230, and an audio/video (A/V) input unit 2250.

The communication unit 2001 may include at least one element for establishing communication between the electronic device 2000 and the wearable device or between the electronic device 2000 and a server. For example, the communication unit 2001 may include a short-range communication unit 2241, a mobile communication unit 2242, and a broadcast receiving unit 2243.

The short-range communication unit 2241 may include, but is not limited to, a Bluetooth communication unit, a Bluetooth low-energy (BLE) communication unit, a near-field communication (NFC) unit, a wide local area network (WLAN)/Wi-Fi communication unit, a Zigbee communication unit, an infrared data association (IrDA) communication unit, a Wi-Fi Direct (WFD) communication unit, a ultra wideband (UWB) communication unit, an Ant+ communication unit, etc.

The mobile communication unit 2242 exchanges a radio signal with at least one from among a base station, an external terminal, and a server via a mobile communication network. Here, the radio signal may include various types of data generated when a voice call signal, a video call signal, or a text/multimedia message is transmitted or received.

The broadcast receiving unit 2243 receives a broadcast signal and/or broadcast-related information from the outside via a broadcast channel. The broadcast channel may include a satellite channel and a ground-wave channel. In one exemplary embodiment, the electronic device 2000 may not include the broadcast receiving unit 2243.

Also, the communication unit 2001 may enable the wearable device 1000 and the electronic device 2000 to be paired with each other. When the wearable device 1000 and the electronic device 2000 are paired with each other, data may be exchanged between the wearable device 1000 and the electronic device 2000.

The memory 2003 may store a program related to processing and controlling of the controller 2005, and data input to or to be output from the electronic device 2000.

The memory 2003 may include at least one storage medium from among a flash memory type memory, a hard disk type memory, a multimedia card micro type memory, a card type memory (e.g., an SD memory, an XD memory, etc.), a RAM, an SRAM, a ROM, an EEPROM, a PROM, a magnetic memory, a magnetic disk, and an optical disk.

Programs stored in the memory 2003 may be classified into a plurality of modules according to a function. For example, the memory 2003 may be classified into a user interface (UI) module 2261, a touch screen module 2262, a notification module 2263, etc.

The UI module 2261 may provide a specialized UI, a specialized graphics user interface (GUI), etc. linked to the electronic device 2000 according to an applications. The touch screen module 2262 may sense a touch gesture on a user's touch screen and transmit information regarding the touch gesture to the controller 2005. In one exemplary embodiment, the touch screen module 2262 may recognize and analyze a touch code. The touch screen module 2262 may be configured as a separate hardware including a controller.

Various sensors may be included in or near a touch screen to sense a touch or a proximity touch of the touch screen. An example of a sensor that senses a touch of a touch screen includes a tactile sensor. The tactile sensor is capable of sensing a touch of a specific object to a degree or more than the degree that a human can feel. The tactile sensor may sense various information, e.g., the roughness of a contact surface, the hardness of a touched object, the temperature of a contact point, etc.

Another example of a sensor that senses a touch of a touch screen is a proximity sensor.

The proximity sensor is capable of sensing the presence of an object that approaches or that is present near a detection surface using the intensity of an electromagnetic field or infrared rays without a mechanical contact. Examples of the proximity sensor include a transmission type photoelectric sensor, a direct reflective photoelectric sensor, a mirror reflective photoelectric sensor, a high-frequency oscillation proximity sensor, a capacitive proximity sensor, a magnetic proximity sensor, an infrared proximity sensor, etc. Examples of a user's touch gesture may include tapping, touching and holding, double-tapping, dragging, panning, flicking, dragging-and-dropping, swyping, etc.

The notification module 2263 may generate a signal notifying an event of the electronic device 2000. Examples of an event of the electronic device 2000 may include receiving a call signal, receiving a message, inputting a key signal, notifying a schedule, etc. The notification module 2263 may output a notification signal in the form of a video signal via a display unit 2221, output a notification signal in the form of an audio signal via a sound output unit 2222, or output a notification signal in the form of a vibration signal via a vibration motor 2223. An operation of the memory 2003 is as described above and is not described in detail here.

In general, the controller 2005 controls overall operations of the electronic device 2000. For example, the controller 2005 may generally control the elements of the electronic device 2000 by executing a program stored in the electronic device 2000.

The user input receiving unit 2210 should be understood as means for inputting data enabling a user to control the electronic device 2000. For example, the user input unit 1100 may be a key pad, a dome switch, a touch pad (including a contact type capacitive touch pad, a pressure-type resistive overlay touch pad, an infrared sensor type touch pad, a surface ultrasonic conductive touch pad, an integral-equation tension measuring type touch pad, a piezo-effect type touch pad, etc.), a jog wheel, a jog switch, etc, but is not limited thereto.

The output unit 2220 may output an audio signal, a video signal, or a vibration signal, and include the display unit 2221, the sound output unit 2222, and the vibration motor 2223.

The display unit 2221 outputs information processed by the electronic device 2000.

When the display unit 2221 and a touch pad form a touch screen together in a layered structure, the display unit 2221 may be used as not only an output device but also an input device. The display unit 2221 may include at least one from among a liquid crystal display, a thin-film transistor-liquid crystal display, an organic light-emitting diode, a flexible display, a 3D display, and an electrophoretic display. The electronic device 2000 may include two or more display units 2221 according to the type thereof. In this case, the two or more display units 2221 may be disposed to face each other by using a hinge.

The sound output unit 2222 outputs an audio signal received from the communication unit 2001 or stored in the memory 2003. Also, the sound output unit 2222 outputs a sound signal related to a function of the electronic device 2000 (e.g., a call signal alarm sound, a message alarm sound, a notification alarm, etc.). The sound output unit 2222 may include a speaker, a buzzer, etc.

The vibration motor 2223 may output a vibration signal. For example, the vibration motor 2223 may output a vibration signal corresponding to an output of audio/video data (e.g., a call signal alarm sound, a message alarm sound, etc.). Also, the vibration motor 2223 may output a vibration signal when a touch screen is touched.

The sensing unit 2230 may sense a state of or ambient state of the electronic device 2000 and transmit a result of sensing the state or ambient state of the electronic device 2000 to the controller 2005.

The sensing unit 2230 may include, but is not limited to, a magnetic sensor 2231, an acceleration sensor 2232, a temperature/humidity sensor 2233, an infrared sensor 2234, a gyroscope sensor 2235, a location sensor (e.g., a GPS) 2236, a pressure sensor 2237, a proximity sensor 2238, and an illuminance sensor 2239. The functions of the sensors would be intuitively inferred by those of ordinary skill in the art, based the names of the sensors and are thus not described in detail here.

The A/V input unit 2250 may be used to input an audio signal or a video signal, and include a camera 2251, a microphone 2252, etc. The camera 2251 may obtain a video frame such as a still image or video in a video call mode or a shooting mode. An image captured by an image sensor may be processed by the controller 2005 or an additional image processor (not shown).

A video frame processed by the camera 2251 may be stored in the memory 2003 or transmitted to the outside via the communication unit 2001. Two or more cameras 2251 may be used according to the type of a terminal.

The microphone 2252 receives an external sound signal and converts it into electric voice data. For example, the microphone 2252 may receive a sound signal from an external electronic device 2000 or a speaker. The microphone 2252 may use various noise removing algorithms to remove noise generated when an external sound signal is received.

Figure 16:
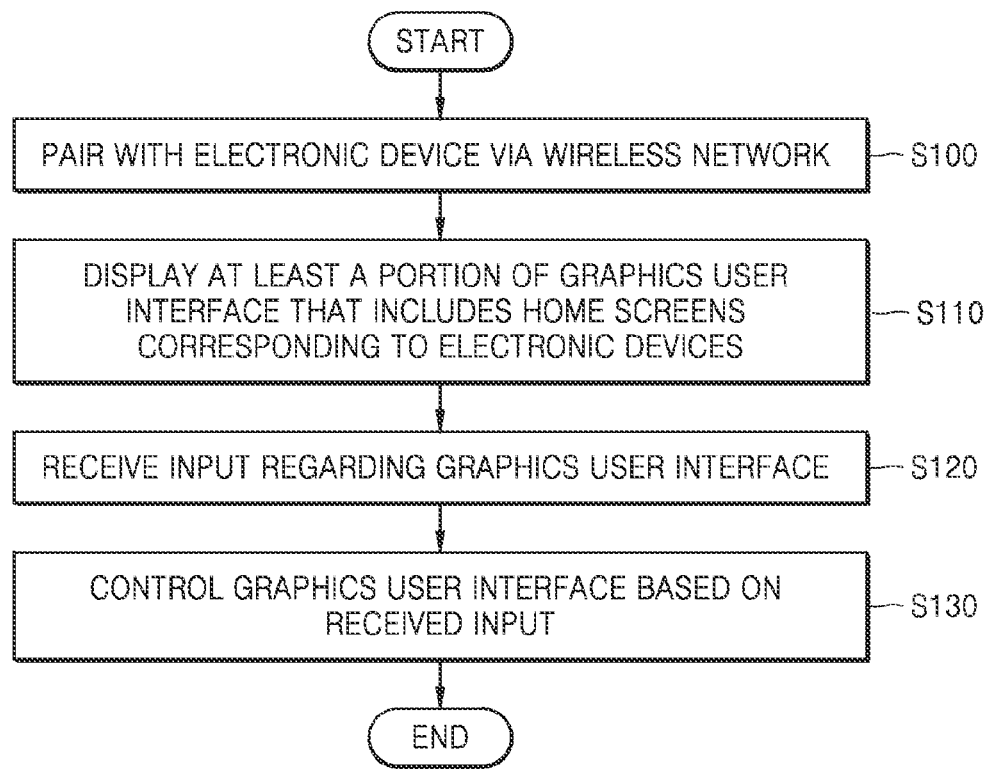
FIG. 16 is a flowchart of a method of controlling a wearable device according to an exemplary embodiment.

FIG. 16 is a flowchart of a method of controlling a wearable device according to an exemplary embodiment.

Referring to FIG. 16, in operation S100, a wearable device pairs with a plurality of electronic devices via a wireless network. The wireless network may be Bluetooth.

In operation S110, the plurality of electronic devices are paired with the wearable device in operation S100, the wearable device displays at least a portion of a graphics user interface that includes a plurality of home screens corresponding to the plurality of electronic devices.

The graphics user interface includes the plurality of home screens, and the plurality of home screens correspond to the plurality of electronic devices, respectively. In one exemplary embodiment, each of the plurality of home screens may be configured to be scrolled within the graphics user interface. In one exemplary embodiment, the plurality of home screens may not be scrolled and may be alternately displayed according to a user input.

In one exemplary embodiment, the graphics user interface may include a plurality of pages and the plurality of home screens are arranged on the plurality of pages, respectively.

In one exemplary embodiment, the wearable device may determine an order in which the plurality of home screens are arranged in the graphics user interface, based on a preset criterion.

In one exemplary embodiment, a home screen may be divided by a plurality of grids, and icons of applications to be driven in an electronic device may be arranged between the plurality of grids based on a preset criterion. A method of that the icons of the applications are arranged based on the present criterion has been described above.

In one exemplary embodiment, icons arranged in a home screen may be scrolled based on a received input.

In operation S120, the wearable device receives an input with respect to the graphics user interface displayed in operation S110.

In one exemplary embodiment, the wearable device may receive various inputs from a user. For example, a gesture input may be received using a touch display. The gesture input may be performed using various manners, e.g., tapping, double-tapping, multiple-tapping, long tapping, swyping, dragging, etc.

In operation S130, the wearable device controls the graphics user interface based on the input received in operation S120.

The wearable device controls the graphics user interface according to the type of a user input. In one exemplary embodiment, when a scroll input, e.g., a swype input or a drag input, with respect to the graphics user interface is received, a home screen may be scrolled within the graphics user interface.

In one exemplary embodiment, in a home screen, icons displayed in the home screen may be scrolled or other icons that were not displayed may be displayed instead of the displayed icons, based on an input received with respect to a grid intersection. In this case, the other icons that were not displayed may have been arranged subsequent to the displayed icons.

In one exemplary embodiment, when a drag input passing by at least one icon among icons starting from an grid intersection in a home screen is received, the at least one icon that the drag input passes by may be selected.

In one exemplary embodiment, when an application icon is selected, various commands may be performed on the selected application icon. For example, a command instructing to delete the application icon selected by the wearable device, a command instructing to move the selected application icon to another folder, a command instructing to rearrange the selected application icon, etc. may be performed. However, exemplary embodiments are not limited thereto and other various commands may be performed.

In one exemplary embodiment, when a drag input passing by at least one from among icons, starting from an grid intersection is received, a command instructing to select and rearrange the at least one icon that the drag input passes by may be performed.

In one exemplary embodiment, a wearable device may mediate between a plurality of electronic devices. The wearable device may mediate between the plurality of electronic devices by obtaining metadata from one electronic device and transmitting the metadata to another electronic device.

In one exemplary embodiment, the data obtained from the electronic device by the wearable device may be transmitted to another electronic device again via the wearable device.

Apparatuses according to the inventive concept may include a processor, a memory for storing and executing program data, a permanent storage unit such as a disk drive, a communication port for communicating with an external device, a user interface device such as a touch panel, a key, a button, etc., and so on. Methods that may be embodied as software modules or algorithms may be stored in a computer readable recording medium in the form of computer readable codes or program instructions that can be executed in the processor. Examples of the computer-readable recording medium include a magnetic storage medium (e.g., a read-only memory (ROM), a random access memory (RAM), a floppy disk, a hard disc, etc.) and an optical reading medium (e.g., a compact disc (CD)-ROM, a digital versatile disc (DVD), etc.). The computer-readable recording medium can be distributed among computer systems that are interconnected through a network, and the inventive concept may be stored and implemented as computer readable code in the distributed system. Data or a program stored in the computer-readable recording medium can be read by a computer, stored in a memory, and executed by a processor.

All references including publications, patent applications, and patents, cited herein, are hereby incorporated by reference to the same extent as if each reference were individually and specifically indicated to be incorporated by reference and were set forth in its entirety herein.

To help understand the inventive concept, reference numerals are used in exemplary embodiments illustrated in the drawings and specific terms are used to explain these embodiments. However, the inventive concept is not limited by the specific terms. The inventive concept may cover all components that are obvious to those of ordinary skill in the art.

The inventive concept may be represented using functional block components and various operations. Such functional blocks may be realized by any number of hardware and/or software components configured to perform specified functions. For example, the inventive concept may employ various integrated circuit components, e.g., memory, processing elements, logic elements, look-up tables, and the like, which may carry out a variety of functions under control of at least one microprocessor or other control devices. As the elements of the inventive concept are implemented using software programming or software elements, the inventive concept may be implemented with any programming or scripting language such as C, C++, Java, assembler, or the like, including various algorithms that are any combination of data structures, processes, routines or other programming elements. Functional aspects may be realized as an algorithm executed by at least one processor. Furthermore, the inventive concept may employ conventional techniques for electronics configuration, signal processing and/or data processing. The terms 'mechanism', 'element', 'means', 'configuration', etc. are used broadly and are not limited to mechanical or physical embodiments. These terms should be understood as including software routines in conjunction with processors, etc.

The particular implementations shown and described herein are exemplary embodiments and are not intended to otherwise limit the scope of the inventive concept in any way. For the sake of brevity, conventional electronics, control systems, software development and other functional aspects of the systems may not be described in detail. Furthermore, the lines or connecting elements shown in the appended drawings are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless it is specifically described as "essential" or "critical"

The use of the terms "a", "an", and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein can be performed in an appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A wearable device comprising:
a memory storing instructions; and
at least one processor configured to execute the instructions to:
pair with a plurality of electronic devices via a wireless network, each of the plurality of electronic devices is paired with the wearable device when the wearable device is within a network area of an electronic device of the plurality of electronic devices or a network interface;
display at least a portion of a graphics user interface that includes a plurality of home screens corresponding to the plurality of electronic devices; and
control the graphics user interface based on a user input,
wherein each of the plurality of home screens comprises at least one graphic representation of at least one application coupled with each of the plurality of electronic device, the at least one graphic representation being arranged in the each of the plurality of home screens based on a first preset criterion.

2. The wearable device of claim 1, wherein the at least one processor is further configured to execute the instructions to remove from the graphics user interface a home screen corresponding to an electronic device unpaired from the wearable device and insert into the graphics user interface a home screen corresponding to an electronic device paired again with the wearable device.

3. The wearable device of claim 1, wherein the plurality of home screens are scrolled in the graphics user interface based on the user input.

4. The wearable device of claim 1, wherein the at least one processor is further configured to execute the instructions to determine an order in which the plurality of home screens are arranged in the graphics user interface based on a second preset criterion.

5. The wearable device of claim 4, wherein the at least one processor is further configured to execute the instructions to determine an order in which the plurality of home screens are arranged in the graphics user interface based on a proximity between each of the plurality of electronic devices and the wearable device.

6. The wearable device of claim 4, wherein the at least one processor is further configured to execute the instructions to determine an order in which the plurality of home screens are arranged in the graphics user interface based on a location of the wearable device.

7. The wearable device of claim 4, wherein the at least one processor is further configured to execute the instructions to determine an order in which the plurality of home screens are arranged in the graphics user interface based on at least one of a number of times that each of the plurality of electronic devices is paired with the wearable device, whether identification of a respective user of each of the plurality of electronic devices is authenticated, whether a vaccine program is installed in each of the plurality of electronic devices, or a result of analysis on a malignant code or virus in each of the plurality of electronic devices.

8. The wearable device of claim 4, wherein the at least one processor is further configured to execute the instructions to determine an order in which the plurality of home screens are arranged in the graphics user interface based on a chronological order of alarms pushed from the plurality of electronic devices to the wearable device.

9. The wearable device of claim 4, wherein the at least one processor is further configured to execute the instructions to determine an order in which the plurality of home screens are arranged in the graphics user interface by analyzing a user's usage pattern of each of the plurality of electronic devices.

10. The wearable device of claim 1, wherein the at least one graphic representation is arranged in the each of the plurality of home screens based on an order in which at least one coupled application is arranged in a predetermined region of the each of the plurality of electronic devices.

11. The wearable device of claim 1, wherein the at least one graphic representation is arranged in the each of the plurality of home screens based on a frequency of driving at least one coupled application in the each of the plurality of electronic devices.

12. The wearable device of claim 1, wherein the at least one graphic representation arranged between a plurality of grids in the each of the plurality of the home screens and scrolled based on an input with respect to an intersection of the plurality of grids.

13. The wearable device of claim 1, wherein the at least one graphic representation is arranged between a plurality of grids in the each of the plurality of the home screens, and
wherein the at least one processor is further configured to execute the instructions to select the at least one graphic representation based on a drag input, starting from an intersection of the plurality of grids, passes by in the plurality of home screens.

14. The wearable device of claim 1, wherein the at least one processor is further configured to execute the instructions to transmit data obtained from a first electronic device corresponding to a first home screen to a second electronic device corresponding to a second home screen among the plurality of home screens based on inputs with respect to the first and second home screens.

15. The wearable device of claim 14, wherein the at least one processor is further configured to execute the instructions to mediate between the first electronic device and the second electronic device by transmitting metadata obtained from the first electronic device to the second electronic device.

16. A method of controlling a wearable device, the method comprising:
pairing with a plurality of electronic devices via a wireless network, each of the plurality of electronic devices is paired with the wearable device when the wearable device is within a network area of an electronic device of the plurality of electronic devices or a network interface;
displaying at least a portion of a graphics user interface that includes a plurality of home screens corresponding to the plurality of electronic devices; and controlling the graphics user interface based on a user input, wherein each of the plurality of home screens comprises at least one graphic representation of at least one application coupled with each of the plurality of electronic device, the at least one graphic representation being arranged in the each of the plurality of home screens based on a first preset criterion.

17. The method of claim 16, further comprising:

removing from the graphics user interface a home screen corresponding to an electronic device unpaired from the wearable device; and inserting into the graphics user interface a home screen corresponding to an electronic device paired again with the wearable device.

18. The method of claim 16, wherein the plurality of home screens are scrolled in the graphics user interface based on the user input.

19. The method of claim 16, further comprising determining an order in which the plurality of home screens are arranged in the graphics user interface based on a second preset criterion.

20. The method of claim 16, further comprising:

receiving a first input regarding a first home screen from among the plurality of home screens;

obtaining data from a first electronic device corresponding to the first home screen based on the first input;

receiving a second input regarding a second home screen from among the plurality of home screens; and transmitting the data obtained from the first electronic device to a second electronic device corresponding to the second home screen based on the second input.

21. A non-transient computer-readable recording medium having recorded thereon a program for causing a wearable device to perform a method of:

pairing with a plurality of electronic devices via a wireless network, each of the plurality of electronic devices is paired with the wearable device when the wearable device is within a network area of an electronic device of the plurality of electronic devices or a network interface;

displaying at least a portion of a graphics user interface that includes a plurality of home screens corresponding to the plurality of electronic devices; and controlling the graphics user interface based on a user input, wherein each of the plurality of home screens comprises at least one graphic representation of at least one application coupled with each of the plurality of electronic device, the at least one graphic representation being arranged in the each of the plurality of home screens based on a preset criterion.

* * * * *